United States Patent
Subramanian et al.

(10) Patent No.: US 11,827,240 B2
(45) Date of Patent: Nov. 28, 2023

(54) SYSTEMS AND METHODS FOR COSTING AUTONOMOUS VEHICLE MANEUVERS

(71) Applicant: UATC, LLC, Mountain View, CA (US)

(72) Inventors: Vijay Subramanian, Canonsburg, PA (US); Moslem Kazemi, Allison Park, PA (US); David Mcallister Bradley, Pittsburgh, PA (US); Michael Lee Phillips, Pittsburgh, PA (US)

(73) Assignee: UATC, LLC, Mountain View, CA (US)

(*) Notice: Subject to any disclaimer, the term of this patent is extended or adjusted under 35 U.S.C. 154(b) by 256 days.

(21) Appl. No.: 17/130,124

(22) Filed: Dec. 22, 2020

(65) Prior Publication Data
US 2022/0176995 A1    Jun. 9, 2022

Related U.S. Application Data

(60) Provisional application No. 63/123,178, filed on Dec. 9, 2020.

(51) Int. Cl.
| | | |
|---|---|---|
| *B60W 60/00* | (2020.01) | |
| *G05D 1/02* | (2020.01) | |
| *B60W 50/14* | (2020.01) | |
| *B60W 30/12* | (2020.01) | |

(52) U.S. Cl.
CPC ........ *B60W 60/0011* (2020.02); *B60W 30/12* (2013.01); *B60W 50/14* (2013.01); *B60W 60/0015* (2020.02); *G05D 1/0214* (2013.01); *B60W 2050/146* (2013.01); *B60W 2554/4041* (2020.02); *G05D 2201/0213* (2013.01)

(58) Field of Classification Search
CPC .. B60W 60/0011; B60W 30/12; B60W 50/14; B60W 60/0015; B60W 2050/146; B60W 2554/4041; G05D 1/0214; G05D 2201/0213
See application file for complete search history.

(56) References Cited

U.S. PATENT DOCUMENTS

| | | | |
|---|---|---|---|
| 2016/0223348 A1* | 8/2016 | Witte | G01C 21/3492 |
| 2018/0209801 A1* | 7/2018 | Stentz | G01C 21/3415 |
| 2019/0258251 A1* | 8/2019 | Ditty | G06V 20/588 |
| 2021/0318683 A1* | 10/2021 | Luo | G01C 21/3453 |

* cited by examiner

*Primary Examiner* — Abby Y Lin
*Assistant Examiner* — Renee LaRose
(74) *Attorney, Agent, or Firm* — Dority & Manning, P.A.

(57) ABSTRACT

Systems and methods for autonomous vehicle motion planning are provided. Sensor data describing an environment of an autonomous vehicle and an initial travel path for the autonomous vehicle through the environment can be obtained. A number of trajectories for the autonomous vehicle are generated based on the sensor data and the initial travel path. The trajectories can be evaluated by generating a number of costs for each trajectory. The costs can include a safety cost and a total cost. Each cost is generated by a cost function created in accordance with a number of relational propositions defining desired relationships between the number of costs. A subset of trajectories can be determined from the trajectories based on the safety cost and an optimal trajectory can be determined from the subset of trajectories based on the total cost. The autonomous vehicle can control its motion in accordance with the optimal trajectory.

13 Claims, 10 Drawing Sheets

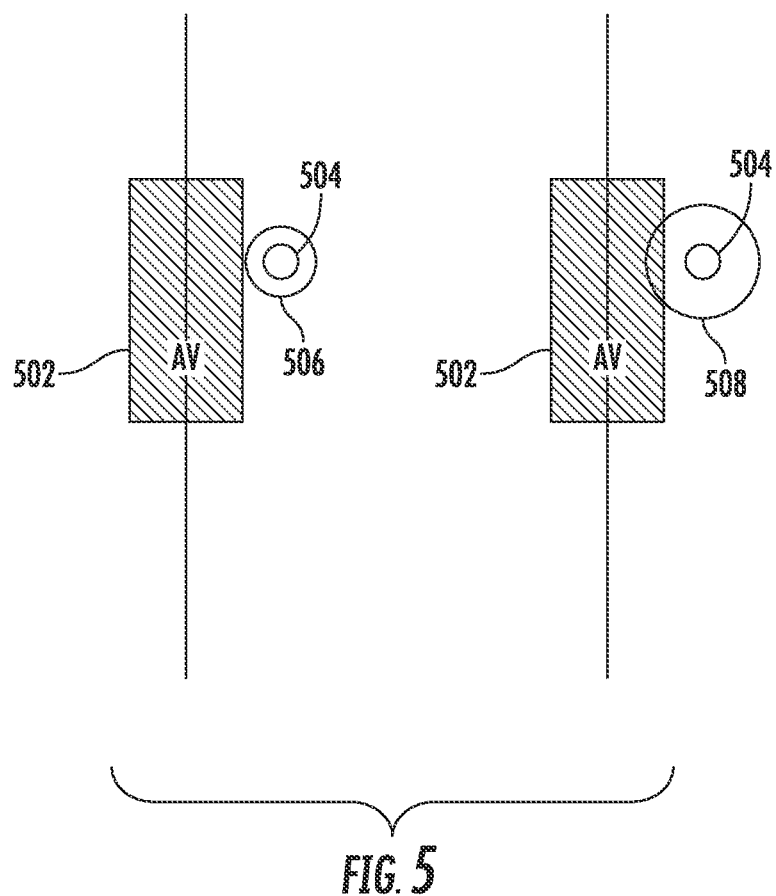

SYSTEMS AND METHODS FOR COSTING AUTONOMOUS VEHICLE MANEUVERS

RELATED APPLICATION

The present application is based on and claims benefit of U.S. Provisional Patent Application No. 63/123,178 having a filing date of Dec. 9, 2020, which is incorporated by reference herein.

FIELD

The present disclosure relates generally to vehicle services and, more particularly, to improved vehicle motion planning.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of implementations of the present disclosure will be set forth in part in the following description, or may be learned from the description, or may be learned through practice of the implementations.

An example aspect of the present disclosure is directed to a computer-implemented method. The method can include obtaining, by a computing system including one or more computing devices, an initial travel path for an autonomous vehicle from a first location to a second location. The method can include obtaining, by the computing system, sensor data describing one or more objects within an environment of the autonomous vehicle. The one or more objects are positioned along the initial travel path. The method can include generating, by the computing system, a plurality of trajectories for the autonomous vehicle based, at least in part, on the sensor data and the initial travel path. The method can include generating, by the computing system, one or more respective costs for each respective trajectory of the plurality of trajectories. The one or more respective costs can include a safety cost and a total cost. The method can include determining, by the computing system, a subset of trajectories from the plurality of trajectories based, at least in part, on the safety cost associated with each trajectory of the plurality of trajectories. The method can include determining, by the computing system, an optimal trajectory from the subset of trajectories based, at least in part, on the total cost associated with each trajectory of the subset of trajectories. And, the method can include controlling, by the computing system, motion of the autonomous vehicle based, at least in part, on the optimal trajectory.

Another example aspect of the present disclosure is directed to a computing system. The computing system can include one or more processors and one or more tangible, non-transitory, computer readable media that collectively store instructions that when executed by the one or more processors cause the computing system to perform operations. The operations can include obtaining a plurality of sub-cost functions configured to evaluate a trajectory for controlling a motion of an autonomous vehicle. Each sub-cost function is configured to generate a respective sub-cost value indicative of the trajectory's impact on one or more motion planning criteria. Each sub-cost function is configured to generate the respective sub-cost value based, at least in part, on sensor data indicative of a surrounding environment of the autonomous vehicle, a period of time, and the trajectory. The operations include obtaining one or more relational propositions associated with the plurality of sub-cost functions. Each relational proposition is indicative of a desired relationship between at least two of the plurality of sub-cost functions. The operations include generating verification data indicative of whether the plurality of sub-cost functions achieve the one or more relational propositions based, at least in part, on the plurality of sub-cost functions and the one or more relational propositions. And, the operations include providing for display, via one or more display devices, the verification data.

Yet another example aspect of the present disclosure is directed to an autonomous vehicle. The autonomous vehicle can include one or more processors and one or more tangible, non-transitory, computer readable media that collectively store instructions that when executed by the one or more processors cause the one or more processors to perform operations. The operations include obtaining an initial travel path for the autonomous vehicle from a first location to a second location. The operations include obtaining sensor data describing one or more objects within an environment of the autonomous vehicle. The one or more objects are positioned along the initial travel path. The operations include generating a plurality of trajectories for the autonomous vehicle based, at least in part, on the sensor data and the initial travel path. The operations include generating one or more respective costs for each respective trajectory of the plurality of trajectories. The one or more respective costs can include a safety cost and a total cost. The operations include determining a subset of trajectories from the plurality of trajectories based, at least in part, on the safety cost associated with each trajectory of the plurality of trajectories. The operations include determining an optimal trajectory from the subset of trajectories based, at least in part, on the total cost associated with each trajectory of the subset of trajectories. And, the operations include controlling motion of the autonomous vehicle based, at least in part, on the optimal trajectory.

Other example aspects of the present disclosure are directed to other systems, methods, vehicles, apparatuses, tangible non-transitory computer-readable media, and the like for autonomous vehicle motion planning.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 5 depicts representations of a buffer distance associated with an object according to example embodiments of the present disclosure;

DETAILED DESCRIPTION

Figure 1:
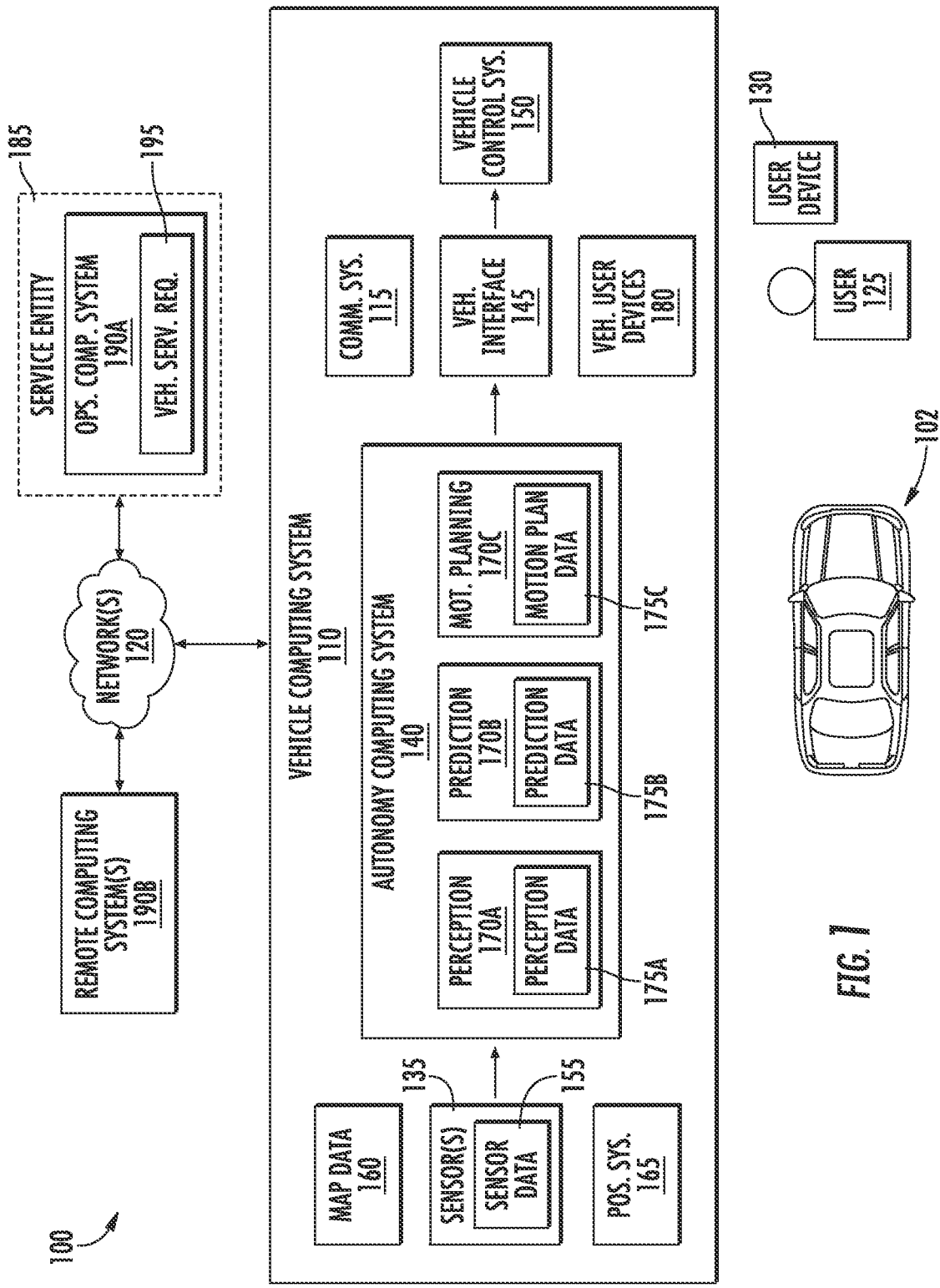
FIG. 1 depicts a block diagram of an example system for controlling the navigation of an autonomous vehicle according to example embodiments of the present disclosure.

Generally, the present disclosure is directed to an improved motion planning framework for generating a trajectory that can be used to direct an autonomous vehicle from a first position to a second position. More specifically, the framework can be utilized for generating executable autonomous vehicle motion trajectories that aim to prioritize roadway safety over other factors (e.g., passenger comfort, following roadway signs, etc.). For example, the onboard computing system of an autonomous vehicle (e.g., vehicle computing system) can obtain an initial travel path describing a path for the autonomous vehicle to travel from the first position to the second position. The initial travel path can include a nominal path within lane boundaries and/or other reference points within the autonomous vehicle's environment. The vehicle computing system can access sensor data (e.g., LiDAR, RADAR, image data, etc.) that is descriptive of the environment (e.g., objects, lane markings, lane boundaries, roadway signs, etc.) surrounding the autonomous vehicle. The vehicle computing system (e.g., a motion planner) can generate a plurality of potential trajectories for the autonomous vehicle based on the sensor data and the initial travel path. Each trajectory can be executable by the autonomous vehicle to move the vehicle from the first position to the second position.

The vehicle computing system can determine, for each respective potential trajectory, a cost associated with the respective potential trajectory (e.g., based on interference avoidance, maintaining lane position, gentle acceleration, etc.). Each cost can include an aggregation of a number of sub-cost values designed to score a respective trajectory's impact on motion planning criteria (e.g., interference avoidance criteria, progress criteria, road departure criteria, etc.) for assessing the desirability of a vehicle trajectory. To encourage vehicle safety, each cost can include a safety cost (e.g., an aggregation of all sub-cost values associated with vehicle safety) and a total cost (e.g., an aggregation of all sub-cost values). The vehicle computing system can identify a subset of the potential trajectories with the lowest determined safety cost and select an optimal trajectory from the subset of potential trajectories (e.g., the potential trajectory of the subset with the lowest total cost). The lower safety cost can be indicative of a safer trajectory for the vehicle, its occupants, the surrounding environment, etc. Once an optimal trajectory has been selected, the data associated with the trajectory can be communicated to a vehicle controller. The controller can cause the autonomous vehicle to move in accordance with the trajectory.

Each of the number of sub-cost values can be dynamically determined in order to prioritize motion planning criteria relating to roadway safety. In this respect, each sub-cost value can be determined based on a corresponding sub-cost function configured to generate a respective sub-cost value based on the sensor data, the respective trajectory, and respective motion planning criteria. A sub-cost function can be evaluated and verified against one or more relational propositions defining a desired relationship between at least two of the sub-cost functions. A relational proposition can emphasize safety sub-cost functions (e.g., sub-cost functions related to roadway safety) over other sub-cost functions (e.g., sub-cost functions related to passenger convenience, etc.). The number of sub-cost functions can be validated in the event that a relational proposition is achieved. If any of a number of predefined relational propositions are not achieved by the number of sub-cost functions, one or more cost modification(s) can be determined for the sub-cost functions. The cost modifications can include suggested modifications to the sub-cost functions to achieve the relational propositions. The number of sub-cost functions can be preloaded (e.g., cached) in a memory onboard an autonomous vehicle. In such a case, the autonomous vehicle can validate each of the sub-cost functions (e.g., on start-up, periodically, etc.) to continuously ensure that safety is prioritized over other motion planning criteria.

In this manner, the systems and methods of the present disclosure provide improved techniques for implementing motion trajectories for autonomous vehicles to emphasize roadway safety over other motion planning criteria. By continuously validating sub-cost functions against a number of relational propositions, the systems and methods of the present disclosure can create and modify trajectory costing functions without harming the integrity of autonomous vehicle motion planning. In this way, the systems and methods disclosed herein can leverage a new type of verification criteria (e.g., relational propositions, etc.) to improve vehicle safety. Moreover, the systems and methods of the present disclosure describe new trajectory evaluation techniques that can identify a subset of safe trajectories before fully costing each of a number of potential trajectories. In this manner, the systems and methods of the present disclosure provide an improvement to the functioning of a computer by reducing computing resources previously utilized to evaluate unusable (and therefore non-optimal) trajectories. Ultimately, the systems and methods described herein improve vehicle safety by ensuring the selection of safe vehicle motion plans.

More particularly, an autonomous vehicle can include a vehicle computing system. The vehicle computing system can be responsible for, among other functions, creating the control signals needed to effectively control an autonomous vehicle. The vehicle computing system can include an autonomy computing system. The autonomy computing system can include one or more systems that enable the autonomous vehicle to plan a route, receive sensor data about the environment, perceive objects within the vehicle's surrounding environment (e.g., other vehicles), predict the motion of the objects within the surrounding environment, generate trajectories based on the sensor data and/or perceived/predicted motion of the objects, and, based on the trajectory, transmit control signals to a vehicle control system to enable the autonomous vehicle to progress to a target destination. To accomplish these operations, the autonomy computing system can include, for example, a perception system, a prediction system, and/or a motion planning system. In some implementations, a perception system, a prediction system, and/or a motion planning system can be separate and/or utilize separate computing resources from one another. In some implementations, one or more of these systems can be combined and/or share computing resources.

The vehicle computing system (e.g., the perception system) can access sensor data from one or more sensors to identify static objects and/or dynamic objects (actors) in the autonomous vehicle's surrounding environment. The vehicle computing system can use a positioning system and/or a communication system to determine a current location within the surrounding environment. Based on this location information, the vehicle computing system can access map data (e.g., HD map data, etc.) to determine the autonomous vehicle's current position relative to other objects in the world (e.g., bicycles, pedestrians, other vehicles, buildings, etc.), as well as map features such as, for example, lane boundaries, curbs, and so on. The vehicle computing system (e.g., the perception system) can utilize the sensor data to identify one or more objects within the surrounding environment of the autonomous vehicle. The sensor data can include, but is not limited to, data acquired via: camera sensors, LIDAR sensors, and RADAR sensors. Using this sensor data, the vehicle computing system can generate perception data that describes object(s) in the vicinity of the autonomous vehicle (e.g., current location, speed, heading, shape/size, etc.). The perception data can be utilized to predict the future motion of the object(s). For example, the vehicle computing system (e.g., the prediction system) can use the perception data to generate predictions for the movement of one or more objects as an object trajectory including one or more future coordinates/points. In some implementations, perception and prediction functions of the vehicle computing system can be included within the same system.

The vehicle computing system (e.g., the motion planning system) can use the perception data, prediction data, map data, and/or other data to generate a motion plan for the vehicle. For example, a route can describe a specific path for the autonomous vehicle to travel from a current location to a destination location. The vehicle computing system can generate potential trajectories for the autonomous vehicle to follow as it traverses the route. Each potential trajectory can be executable by the autonomous vehicle (e.g., feasible for the vehicle control systems to implement, etc.) and can include a one or more future coordinates, points, speeds, etc. over a specific amount of travel time (e.g., eight seconds, etc.). As described herein, the autonomous vehicle can select and implement a trajectory for the autonomous vehicle to navigate a specific segment of the route. For instance, the trajectory can be translated and provided to the vehicle control system(s) that can generate specific control signals for the autonomous vehicle (e.g., adjust steering, braking, velocity, and so on). The specific control signals can cause the autonomous vehicle to move in accordance with the selected trajectory.

The vehicle computing system (e.g., a motion planning system) can select a trajectory from a variety of potential trajectories to ensure that the autonomous vehicle is traveling in a safe and comfortable manner. To do so, the vehicle computing system can obtain an initial travel path for the autonomous vehicle from a first location to a second location and/or map data descriptive of one or more road features around the first location, the second location, and/or therebetween. The initial travel path and/or map data can be obtained from a map repository. The initial travel path (e.g., a nominal path) can represent an ideal travel path from the first position to the second position without regard to any objects that may be in the current environment but are not included in existing map data. For example, the initial travel path may not take the presence of other moving vehicles into account because the number and position of such objects is constantly changing and can be accounted for by live sensor data.

The initial travel path can be based, at least in part, on the map data. For example, map data can include information about a particular geographic location including one or more geographic features including roads, boundaries (e.g., lane boundaries, curbs, etc.), buildings, information about expected traffic patterns, and so on. The initial travel path can be a nominal path for the autonomous vehicle with respect to geographic features such as, for example, a path that maintains the position of the autonomous vehicle within two lane boundaries on a travel way (e.g., lane lines on a road, etc.). In some implementations, the initial travel path can be pre-determined for a particular geographic area and stored (e.g., prior to the vehicle traveling in that area). In some implementations, the data indicative of the initial travel path can be stored offline (e.g., by a remote computing system) and can be obtained by the vehicle computing system. In some implementations, the data indicative of the initial travel path can be encoded as a feature in the map data. The initial travel path can be determined in real-time by the autonomous vehicle or a remote computing system as the vehicle is traveling.

The vehicle computing system can obtain sensor data describing one or more objects within the surrounding environment of the autonomous vehicle. In some implementations, at least a subset of the object(s) can be positioned along the initial travel path. An object may be considered to be positioned along the initial travel path in the event that a least a portion of the object encroaches/overlaps (and/or is predicted to encroach/overlap) the initial travel path or the outer edge of the object is (and/or is predicted to be) within a threshold distance from the initial travel path (e.g., 5 ft, 10 ft, 15 ft, 20 ft, etc.). Such object(s) can have higher relevance for planning the motion of the autonomous vehicles than object(s) that do not encroach the initial travel path or are located beyond the threshold distance. The threshold distance can represent a distance at which the autonomous vehicle may consider a lateral movement away from the object to increase the distance between the autonomous vehicle and the object (e.g., a buffer distance for passing the object).

The vehicle computing system can generate a plurality of trajectories based, at least in part, on the sensor data and the initial travel path. As described herein, the plurality of trajectories can be executable trajectories that are dynamically feasible for the autonomous vehicle (and/or a vehicle model). For example, the autonomous vehicle can be capable of controlling its motion to travel to waypoint(s) that define a trajectory. A trajectory can be defined by a spatial path (e.g., x, y, yaw, curvature, etc.) and/or steering quantities (e.g., wrench, twist, steering angle, steering angle velocity, angular velocity, lateral speed, lateral acceleration, lateral jerk, etc.). A trajectory can also be associated with a particular time period (e.g., 5 s, 8 s, 10 s, etc.) that indicates the time for which the vehicle may travel along the trajectory's path with the associated parameters (e.g., velocity, acceleration, etc.). The time period can also, or alternatively, be associated with a planning cycle of the vehicle's motion planning system.

Each trajectory can include a velocity profile and a lateral offset profile that are used to describe the position of the vehicle as it travels and the speed of the autonomous vehicle at different times during the trajectory (e.g., the velocity profile can include acceleration values and the time at which those acceleration values are to be implemented). When generating the plurality of trajectories, the vehicle computing system can determine the velocity profile and the offset profile for each trajectory based, at least in part, on the detected object(s) and/or the initial travel path.

A velocity profile can include data indicating one or more acceleration values and, for each acceleration value, a time at which that acceleration value will be implemented. For instance, a velocity profile can include a representation of a planned acceleration at one or more points in time. Based on this acceleration, a current velocity can be determined at any point in the acceleration. Additionally, or alternatively, the velocity profile can include one or more velocities and a time at which the vehicle will reach those velocities. The velocity profile can also include a vehicle jerk and/or an odometer position. In some examples, the velocity profiles can be generated based, at least in part, on map data including stopping locations such as stop signs, traffic lights, and/or traffic gridlock. The velocity profiles can also be generated based on speed targets associated with a legal speed limit or a velocity target associated with one or more other factors (e.g., measured average traffic velocity for a particular area).

An offset profile for a respective trajectory can include a plurality of offset values. An offset value can represent the distance and direction that the respective trajectory differs from the initial travel path at one or more times during the initial travel path. For example, a particular offset value may indicate that at a time 3 seconds into the path, the respective potential trajectory places the autonomous vehicle 0.7 meters north of the initial travel plan. In some implementations, the offset profile can be represented as a line on a graph wherein one axis on the graph represents the degree and direction of lateral variation from the initial travel path and the other axis represents time. Each offset profile can be mapped onto the initial travel path to generate one or more trajectories. Thus, each trajectory follows the general path of the initial travel path with one or more lateral adjustments.

The vehicle computing system can generate a large number of potential trajectories for the vehicle, such that most if not all possible paths are represented as a lateral deviation from the initial travel path. This allows many additional alternatives to quickly and efficiently be considered, while still maintaining a high degree of safety for the autonomous vehicle. For example, if the initial travel path can be represented as a path through an environment, the offset profile for a particular trajectory can be represented as a path that follows the general route of the initial travel path but is offset laterally along the initial travel path distance. The degree to which the particular trajectory is laterally offset from the initial travel path can be represented as a function of time.

The vehicle computing system can generate one or more respective cost(s) for each respective trajectory in the plurality of trajectories based, at least in part, on the obtained sensor data. For instance, the vehicle computing system can score each trajectory against one or more cost function(s) designed to score a trajectory based on one or more motion planning criteria associated with the safe, efficient, and comfortable motion of a vehicle. The cost function(s), for example, can be encoded for the avoidance of object interferences, for the autonomous vehicle to stay on the travel way/within lane boundaries, prefer gentle accelerations to harsh ones, etc. As further described herein, the cost function(s) can consider vehicle dynamics parameters (e.g., to keep the ride smooth, acceleration, jerk, etc.) and/or map parameters (e.g., speed limits, stops, travel way boundaries, etc.). The cost function(s) can also, or alternatively, take into account at least one of the following object cost(s): interference costs (e.g., cost of avoiding/experiencing potential interference with another object, minimization of speed, etc.); overtaking buffer (e.g., give 4 ft of space with overtaking a bicycle, etc.); headway (e.g., preserve stopping distance when applying adaptive cruise control motion for a moving object, etc.); actor caution (e.g., preserve the ability to stop for unlikely events, etc.); behavioral blocking (e.g., avoid overtaking backed-up traffic in vehicle lane, etc.); or other parameters. In some implementations, the cost function(s) can account for fixed buffer and/or speed dependent buffers (e.g., requiring more space for actors when the vehicle is passing at higher speeds, etc.). In some implementations, the cost function(s) can account for map geometry features such as the distance from the initial travel path, the location of lane boundaries, and road boundaries.

The vehicle computing system can determine an optimal trajectory based on the one or more respective cost(s) for each respective trajectory in the plurality of trajectories and control the motion of the autonomous vehicle based on the optimal trajectory. As an example, the vehicle computing system can score the plurality of different trajectories (each one having a different offset profile and a different velocity profile) based on a number of factors. For example, the vehicle computing system can perform object interference detection (e.g., an interference cost function, etc.) to determine a likelihood that a trajectory will cause the autonomous vehicle to interfere with any objects (e.g., travel closer than a certain distance to an object). In the event that the vehicle computing system determines that a trajectory has a chance to interfere with an object, the system (e.g., an interference cost function, etc.) can generate a cost for that particular trajectory. The optimal trajectory can include a trajectory associated with one or more lower cost(s).

By way of example, the computing system can generate a plurality of sub-cost values for a respective trajectory. Each sub-cost value can be associated with a respective motion planning factor. The vehicle computing system can generate respective cost(s) for the respective trajectory based, at least in part, on one or more of the plurality of sub-cost values. Each sub-cost value can be generated based, at least in part, on a corresponding sub-cost function. Each sub-cost function can be configured to evaluate one or more aspects of the respective trajectory for controlling a motion of an autonomous vehicle. For example, each sub-cost function can be configured to generate a respective sub-cost value indicative of the trajectory's impact on one or more motion planning criteria. Each sub-cost function can be configured to generate the respective sub-cost value based, at least in part, on sensor data indicative of a surrounding environment of the autonomous vehicle, a period of time, the trajectory, and/or at least one of the one or more motion planning criteria. As an example, the interference sub-cost function can be configured to generate an interference sub-cost value indicative of a likelihood that a respective trajectory can cause vehicle interference (e.g., with one or more objects, etc.) at a respective time.

The motion planning criteria can include criteria for assessing the desirability of a vehicle trajectory. As examples, the motion planning criteria can include progress criteria defining a desirability for a trajectory to move a vehicle along a desired route, interference avoidance criteria defining a desirability for a trajectory to avoid interference (and/or the potential for interference) with the vehicle, road departure criteria defining a desirability for a trajectory to keep the vehicle one or more distances away from a road boundary, lane departure criteria defining a desirability for a trajectory to keep the vehicle one or more distances away from a lane boundary, jerk criteria defining a desirability for a trajectory to minimize sudden turning movements of the vehicle, acceleration/deceleration criteria defining a desirability for a trajectory to minimize sudden stopping or starting movements of the vehicle, stop sign criteria defining a desirability for a trajectory that makes a complete stop in response to a stop sign, and/or any other criteria for ensuring the safe, comfortable, and regulatory movement of an autonomous vehicle.

More particularly, the one or more motion planning criteria can include one or more safety criteria and/or one or more secondary criteria. The safety criteria, for example, can include motion planning criteria that can have an impact on roadway safety, whereas the secondary criteria can include motion planning criteria with minimal to no impact on roadway safety. A motion planning criteria's impact of roadway safety can include a measure of a respective criteria's relevance to the safe operation of vehicles on roadways. A motion planning criteria can have an impact of roadway safety in the event that the criteria encourages the selection of vehicle trajectories that follow guidelines such as, for example, remaining within a traffic lane, remaining on a road surface, following speed thresholds, maintaining safe distances between the vehicle and other roadway objects, and/or any other guidelines for safely operating a vehicle. For example, the safety criteria can include a small set of criteria that has a direct or indirect impact on vehicle safety. As an example, the safety criteria can be indicative of interference avoidance, road departure avoidance, and/or lane departure avoidance. By way of example, the safety criteria can include interference avoidance criteria, road departure criteria, and/or lane departure criteria.

The secondary criteria can include any criteria that does not have a direct or significant impact on vehicle safety. For example, the secondary criteria can include passenger comfort criteria such a criteria for minimizing a sudden movement of the vehicle, etc. The secondary criteria can be indicative of a reward for making progress during a trajectory, negative costs for trajectories with harsh braking, etc. In addition, or alternatively, the secondary criteria can include roadway standard criteria such as stop sign criteria indicative of negative costs for failing to stop at a stop sign, yield at a yield sign, etc. In some implementations, the secondary criteria can be dynamically generated based, at least in part, on historical rider data. For example, the autonomous vehicle can be associated with a ride-sharing platform. In such a case, the secondary criteria can be generated to improve rider experience over time based on rider feedback and/or other historical data.

In some implementations, the criteria can include feasibility criteria. The feasibility criteria can be indicative of a physical feasibility of a trajectory (e.g., feasible turn angle, high steering changes, etc.). In some cases, the vehicle computing system can disregard any trajectory failing any feasibility criteria.

Each of the plurality of sub-cost values can represent a respective trajectory's impact on at least one motion planning criteria. For instance, the plurality of sub-cost values can include one or more safety sub-cost values representing a trajectory's impact on at least one safety criteria. The safety sub-cost values can include, for example, an interference sub-cost representing a trajectory's impact on the interference avoidance criteria. For example, the interference sub-cost can include a high value in the event that a trajectory has the potential to cause interference with the vehicle and a low value in the event that the trajectory does not have the potential to cause interference with the vehicle. In some implementations, an interference sub-cost value can be generated for each time during a trajectory.

As another example, the safety sub-cost values can include a road departure sub-cost value representing a trajectory's impact on the road departure avoidance criteria. The road departure sub-cost values can include a hard road departure sub-cost value and/or a soft road departure sub-cost value. The hard road departure sub-cost value can be indicative of a trajectory's closest distance to a road boundary (e.g., as defined by map data, etc.). The road boundary can be a defined distance from the edge of a roadway. The soft road departure sub-cost value can be indicative of a trajectory's closest distance to a buffer of the road boundary (e.g., a safe distance (e.g., 6 inches, etc.) from the defined road boundary). The hard/soft road departure sub-cost values can include a higher value for trajectories that come close to or exceed the defined road boundary and/or buffer of the defined road boundary.

As yet another example, the safety sub-cost values can include a lane departure sub-cost value representing a trajectory's impact on the lane departure avoidance criteria. The lane departure sub-cost value can be indicative of a trajectory's closest distance to a lane marker. The lane departure sub-cost values can include a higher value for trajectories that come close to or exceed the lane marker.

In addition, or alternatively, the plurality of sub-cost values can include one or more secondary sub-cost values representing a trajectory's impact on secondary criteria. The secondary sub-cost values can include, for example, a jerk sub-cost value representing a trajectory's impact on the jerk criteria. For example, the jerk sub-cost value can include a higher value in the event that a trajectory has the potential to cause a sudden turning movement and/or a lower value in the event that the trajectory does not have the potential to cause a sudden turning movement. In this way, the jerk sub-cost value can encourage the selection of smoother trajectories. As other examples, the secondary sub-cost value(s) can include a progress sub-cost value (e.g., a higher value for little progress made towards a destination, a negative or lower value for substantial progress made towards a destination, etc.) representing a trajectory's impact on progress criteria, a stop sign sub-cost value (e.g., a higher value for ignoring a stop sign, a lower value for complying with a stop sign, etc.) representing a trajectory's impact on road sign criteria, and/or any other sub-cost value indicative of a trajectory's impact on passenger comfort and/or road regulations.

Each of the sub-cost values can be generated based on a corresponding sub-cost function. For example, the plurality of sub-cost functions can include one or more safety sub-cost functions and/or one or more secondary sub-cost functions. The one or more safety sub-cost functions can be configured to generate one or more safety sub-cost values indicative of the trajectory's impact on at least one of the one or more safety criteria. For example, each of the safety sub-cost value(s) can be generated based on a corresponding safety sub-cost function configured to measure a trajectory's impact on road-way safety. The secondary sub-cost function(s) can be configured to generate secondary sub-cost value(s) indicative of a trajectory's impact on at least one of the one or more secondary criteria. For example, each of the secondary sub-cost value(s) can be generated based on a corresponding secondary sub-cost function configured to measure a trajectory's impact on passenger comfort.

By way of example, a safety sub-cost function can include an interference avoidance function configured to generate an interference sub-cost value based, at least in part, on the respective trajectory's likelihood of causing interference with an object. The interference avoidance function can be configured to obtain sensor data (e.g., perception data, prediction data, etc.) indicative of the surrounding environment (and/or objects therein) of the autonomous vehicle and the offset/velocity profiles of a respective trajectory. Based on this information, the interference avoidance function can determine a probability that the autonomous vehicle will interfere with any object within its surrounding environment during the implementation of the respective trajectory and generate a representative interference sub-cost value.

As another example, a safety sub-cost function can include a road departure avoidance function configured to generate a road departure sub-cost value based on a distance associated with a road boundary and the respective trajectory. The road departure avoidance function can be configured to obtain sensor data (e.g., perception data, prediction data, etc.) indicative of the surrounding environment (e.g., defined road boundaries therein) of the autonomous vehicle and the offset/velocity profiles of a respective trajectory. Based on this information, the road departure avoidance function can determine a probability that the autonomous vehicle will come close to or exceed a defined road boundary and/or buffer distance from a road boundary within its surrounding environment during the implementation of the respective trajectory and generate a representative road departure sub-cost value.

As yet another example, a safety sub-cost function can include a lane departure avoidance function configured to generate a lane departure sub-cost value based on a distance associated with a lane boundary and the respective trajectory. The lane departure avoidance function can be configured to obtain sensor data (e.g., perception data, prediction data, etc.) indicative of the surrounding environment (e.g., defined lane boundaries therein) of the autonomous vehicle and the offset/velocity profiles of the respective trajectory. Based on this information, the lane departure avoidance function can determine a probability that the autonomous vehicle will come close to or exceed a defined lane boundary within its surrounding environment during the implementation of the respective trajectory and generate a representative lane departure sub-cost value.

In some implementations, the autonomous vehicle can be configured to cost trajectories in order to prioritize roadway safety criteria over other motion planning criteria. For example, the plurality of cost functions can be generated and/or verified (onboard the vehicle and/or offboard the vehicle) against one or more relational propositions indicative of a desired relationship (e.g., to emphasize safety) between one or more cost function(s). More particularly, the cost functions can be generated and/or verified by a verification system onboard (e.g., the vehicle computing system) and/or offboard (e.g., remote computing systems) the autonomous vehicle. The verification system can obtain a plurality of sub-cost functions and compare the plurality of sub-cost functions to a number of relational propositions associated with the plurality of sub-cost functions to determine whether the sub-cost functions achieve safety standards (and/or any other motion planning standards) for operating an autonomous vehicle.

The relational propositions can express desired relationships between a number of sub-cost functions and/or motion planning criteria associated therewith. For example, each relational proposition can be indicative of a desired relationship between at least two of the plurality of sub-cost functions. The relational propositions can identify a desired priority and/or hierarchical relationship between the plurality of sub-cost functions. By way of example, the relational propositions can include functions designed to output a boolean value (e.g., true/false) indicative of whether the plurality of sub-cost functions satisfy a plurality of desired priorities and/or hierarchical relationships. In this way, the relational propositions can document a plurality of tradeoffs between a plurality of motion planning criteria.

For instance, a first relational proposition can express a desired relationship for sub-cost functions associated with lane departure avoidance criteria (e.g., a lane departure avoidance function) to take priority over sub-cost functions associated with passenger convenience (e.g., a jerk avoidance function). In addition, or alternatively, a second relational proposition can express a desired relationship for sub-cost functions associated interference avoidance criteria (e.g., an interference avoidance function) to take priority over sub-cost functions associated with passenger convenience (e.g., a jerk avoidance function) and lane departure avoidance criteria (e.g., a lane departure avoidance function). In some implementations, at least one of the one or more relational propositions can identify a safety relationship between each of the one or more safety sub-cost functions and the one or more secondary sub-cost functions. The safety relationship, for example, can define a requirement that each of the one or more safety sub-cost values generated by the one or more safety sub-cost functions outweigh any combination of the one or more secondary sub-cost values generated by the one or more secondary sub-cost functions.

The verification system can generate verification data indicative of whether the plurality of sub-cost functions achieve the one or more relational propositions based, at least in part, on the plurality of sub-cost functions (e.g., functions to be used in the operation of the autonomous vehicle) and/or the one or more relational propositions (e.g., approved relational propositions). For instance, the verification system can compare the one or more relational propositions to the plurality of sub-cost functions to validate the sub-cost functions. For example, the verification system can simulate one or more simulated values generated by the plurality of sub-cost functions by applying the plurality of sub-cost functions to one or more testing motion plan(s) (e.g., simulated motion plan(s), predetermined motion plan, etc.). The verification system can validate the plurality of sub-cost functions by comparing the respective simulated values of each of the sub-cost functions with respect to the relational proposition(s).

The verification system can provide for display, via one or more display devices, the verification data. The verification data can be indicative of a success or failure of each of the one or more relational propositions. In the event of a failure, the verification data can indicate that the plurality of sub-cost functions do not achieve the one or more relational propositions. For example, the verification system can determine at least one deviating relational proposition of the one or more relational proposition(s). The at least one deviating relational proposition can be indicative of at least one of the one or more relational propositions that is not achieved by the plurality of sub-cost functions (e.g., one or more simulated values of the plurality of sub-cost functions).

In some implementations, the verification system can generate one or more cost modifications for the plurality of sub-cost functions based, at least in part, on the one or more relational propositions. For example, the verification system can include an offline tool configured to generate one or more different weights, parameters, etc. for one or more of the sub-cost functions. The one or more different weights, parameters, etc. can be applied to the plurality of sub-cost functions to satisfy the one or more relational proposition(s). In this way, the verification system can automatically generate sub-cost functions based on the relational propositions. The automatic generation of sub-cost functions can be designed as a linear programming problem, the solution of which can include a set of weights and/or parameters for the plurality of sub-cost functions that satisfy each of the one or more relational propositions. In some implementations, the verification system can generate the one or more cost modifications in response to verification data identifying at least one deviating relational proposition. The one or more cost modification(s) for the plurality of sub-cost functions can be based, at least in part, on the at least one deviating relational proposition.

In some implementations, the verification system can obtain user input indicative of a costing change to at least one of the plurality of sub-cost functions and/or the one or more relational propositions. In such a case, the verification system can generate the verification data based on the costing change. For example, the costing change can include an additional sub-cost function in addition to the plurality of sub-cost functions. The verification system can generate the one or more cost modifications for the plurality of sub-cost functions based on the additional sub-cost function. As another example, the costing change can include an additional relational proposition in addition to the one or more relational propositions. The verification system can generate the one or more cost modifications for the plurality of sub-cost functions based on the additional relational proposition.

In some cases, the verification system can validate the plurality of sub-cost functions with respect to the one or more relational proposition(s) each time a change is made to a vehicle computing system. For example, the verification system can automatically generate verification data in response to code changes (e.g., a code change is checked-in, during compilation, etc.) and/or before each new software release. As another example, the plurality of sub-cost functions can be preloaded (e.g., cached) on the one or more tangible, non-transitory, computer readable media of an autonomous vehicle (e.g., vehicle computing system). In such a case, the verification system can obtain start-up data indicative of a start-up operation for the autonomous vehicle and, in response to obtaining the start-up data, generate verification data for the plurality of sub-cost functions. The start-up operation, for example, can indicate that the autonomous vehicle has been powered on for operation, has gone online with a ride-sharing network, has entered an autonomous driving mode, and/or has otherwise become active. The autonomous vehicle can perform one or more vehicle actions in response to the verification data (e.g., disable autonomy capabilities based on verification data indicative of a failure, enable autonomy capabilities in response to a success, etc.).

In some implementations, the autonomous vehicle can be configured to prioritize roadway safety over other motion planning criteria during the selection of the plurality of trajectories. For example, the cost for a particular trajectory can be generated based, at least in part, on the degree to which the trajectory follows established criteria for evaluating trajectories. For example, if the environment includes a stop point (e.g., a stop sign), a trajectory that does not stop before the stop point can be determined to have a high cost. Similarly, a trajectory that stops well short of the stop point may be determined to have a high cost. In some examples, the best trajectory can be a trajectory that travels as far as possible while still stopping before the stop point. In another example, a trajectory that leaves the current lane of the autonomous vehicle will have a high cost (e.g., a lane boundary violation cost).

In some implementations, the vehicle computing system can determine a cost for a trajectory based, at least in part, on the plurality of sub cost functions. For example, the vehicle computing system can generate a cost (or sub-cost value of a cost) for a particular trajectory based on the degree to which it complies with the motion planning criteria. A lower cost score can represent a more preferable trajectory. The vehicle computing system can select a trajectory for the autonomous vehicle based, at least in part, on the determined costs for each respective trajectory. By way of example, once all of the potential trajectories have been scored to generate an associated cost, the vehicle computing system (e.g., the motion planning system) can select the trajectory that has the lowest calculated cost.

In some implementations, the vehicle computing system can be configured to select a trajectory that does not violate any safety-related constraints. The selected trajectory can include the trajectory with the best trade-offs between risk and performance. For example, instead of picking the trajectory with the lowest score, the vehicle computing system can first select a subset of trajectories with a lowest safety score and select a trajectory from the subset of trajectories for implementation.

For example, the vehicle computing system can generate one or more respective costs for each respective trajectory of the plurality of trajectories. The one or more respective costs can include a safety cost and a total cost. The respective cost(s) for each respective trajectory can be generated based, at least in part, on a plurality of sub-cost values. The safety cost for the respective trajectory can be generated based on an aggregation of the one or more safety sub-cost values for the respective trajectory. The total cost for the respective trajectory can be generated based on an aggregation of the plurality of sub-cost values for the respective trajectory.

The vehicle computing system can determine a subset of trajectories from the plurality of trajectories based, at least in part, on the safety cost associated with each trajectory of the plurality of trajectories. The vehicle computing system can determine a minimal safety cost for the plurality of trajectories based, at least in part, on the safety cost associated with each trajectory of the plurality of trajectories. The vehicle computing system can determine the subset of trajectories based on the minimal safety cost. For instance, each trajectory of the subset of trajectories can be associated with a respective safety cost that achieves the minimal safety cost. The vehicle computing system can determine an optimal trajectory from the subset of trajectories based on the total cost associated with each trajectory of the subset of trajectories.

In this way, the vehicle computing system can utilize a tiered approach to trajectory costing and selection. The vehicle computing system can aggregate all safety related sub costs (e.g., most critical safety related sub costs such as interference avoidance sub cost, road departure avoidance sub cost, lane departure avoidance sub cost, etc.). The vehicle computing system can generate a safety score based on the aggregation of all safety related sub costs. The vehicle computing system can determine a minimum safety score and identify a subset of trajectories that share the minimum safety score (e.g., within a defined range). And, the vehicle computing system can select a trajectory with the lowest total cost from the subset of trajectories for implementation.

The vehicle computing system can control the motion of the autonomous vehicle based, at least in part, on the selected trajectory. For instance, once a trajectory has been chosen, the vehicle computing system can transmit the motion to a vehicle controller. The vehicle controller can use the selected trajectory to generate one or more motion controls for the autonomous vehicle. By way of example, the vehicle controller can translate a trajectory into instructions for controlling the autonomous vehicle including adjusting the steering of the vehicle "X" degrees, adjusting a throttle for speed, and/or applying a certain magnitude of braking force. The vehicle controller can transmit those motion controls to the autonomous vehicle to be executed and follow the selected trajectory.

The systems and methods described herein provide a number of technical effects and benefits. More particularly, the systems and methods of the present disclosure provide improved techniques for generating and evaluating trajectories implemented by autonomous vehicles. For instance, a computing system can include relational propositions that can enable the system to validate a set of costing functions in view of a number of desired relationships. The desired relationships can include a priority or hierarchical relationship between a plurality of costing functions configured to evaluate a trajectory based on motion planned criteria. The relational propositions can prioritize safety motion planning criteria (e.g., safety related criteria) over secondary motion planning criteria. In this way, the computing system can provide a practical improvement to autonomous vehicle safety by encouraging the selection of safe vehicle trajectories.

Example aspects of the present disclosure can provide a number of improvements to computing technology such as, for example, autonomous vehicle computing technology. For instance, the systems and methods of the present disclosure can provide an improved approach for vehicle motion planning. For example, a system can obtain an initial travel path for an autonomous vehicle from a first location to a second location. The system can obtain sensor data describing one or more objects within an environment of the autonomous vehicle. The system can generate a plurality of trajectories for the autonomous vehicle based, at least in part, on the sensor data and the initial travel path. The system can generate one or more respective costs for each respective trajectory of the plurality of trajectories. The system can determine a subset of trajectories from the plurality of trajectories based, at least in part, on the safety cost associated with each trajectory of the plurality of trajectories. The system can determine an optimal trajectory from the subset of trajectories based, at least in part, on the total cost associated with each trajectory of the subset of trajectories. And, the computing system can control the motion of the autonomous vehicle based, at least in part, on the optimal trajectory.

In this manner, the computing system can employ improved trajectory costing techniques to optimize trajectory selection in view of a number of motion planning priorities such as vehicle and passenger safety. To this end, the computing system can accumulate and utilize newly available information such as, for example, different relational propositions, sub-cost functions, etc. The relational propositions can be uniquely tailored to motion planning criteria associated with vehicle safety and passenger convenience. In this way, the computing system provides a practical application that improves autonomous vehicle safety by prioritizing vehicle safety over passenger convenience during the selection of a trajectory.

Various means can be configured to perform the methods and processes described herein. For example, a computing system can include data obtaining unit(s), verification unit(s), data providing unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s), etc.) can be configured to obtain a plurality of sub-cost functions configured to evaluate a trajectory for controlling a motion of an autonomous vehicle. Each sub-cost function can be configured to generate a respective sub-cost value indicative of the trajectory's impact on one or more motion planning criteria. Each sub-cost function can be configured to generate the respective sub-cost value based, at least in part, on sensor data indicative of a surrounding environment of the autonomous vehicle, a period of time, and/or the trajectory. In addition, or alternatively, the means (e.g., data obtaining unit(s), etc.) can be configured to obtain one or more relational propositions associated with the plurality of sub-cost functions. Each relational proposition can be indicative of a desired relationship between at least two of the plurality of sub-cost functions. The means (e.g., verification unit(s), etc.) can be configured to generate verification data indicative of whether the plurality of sub-cost functions achieve the one or more relational propositions based, at least in part, on the plurality of sub-cost functions and the one or more relational propositions. And, the means (e.g., display unit(s), etc.) can be configured to provide for display, via one or more display devices, the verification data.

With reference now to FIGS. 1-10, example implementations of the present disclosure will be discussed in further detail. FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a lightweight elective vehicle (e.g., bicycle, scooter, etc.). The vehicle 105 can be any other type of vehicle (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for generating, costing, and selecting a trajectory, controlling an autonomous vehicle to travel in accordance with a trajectory, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 130 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more subsystems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via different subsystems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that are within the surrounding environment of the vehicle 105 based at least in part on the sensor data 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of waypoints. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more waypoints (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The motion planning system 180 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 180 can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or stored onboard the vehicle 105 to another vehicle.

The vehicle computing system 110 can include the one or more vehicle user devices 180. For example, the vehicle computing system 110 can include one or more user devices with one or more display devices located onboard the vehicle 105. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190 (e.g., its one or more processors, etc.) to perform operations and functions, such as those described herein, for example, to generate, verify, and/or modify one or more cost functions for scoring a number of potential vehicle trajectories, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 195 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2:
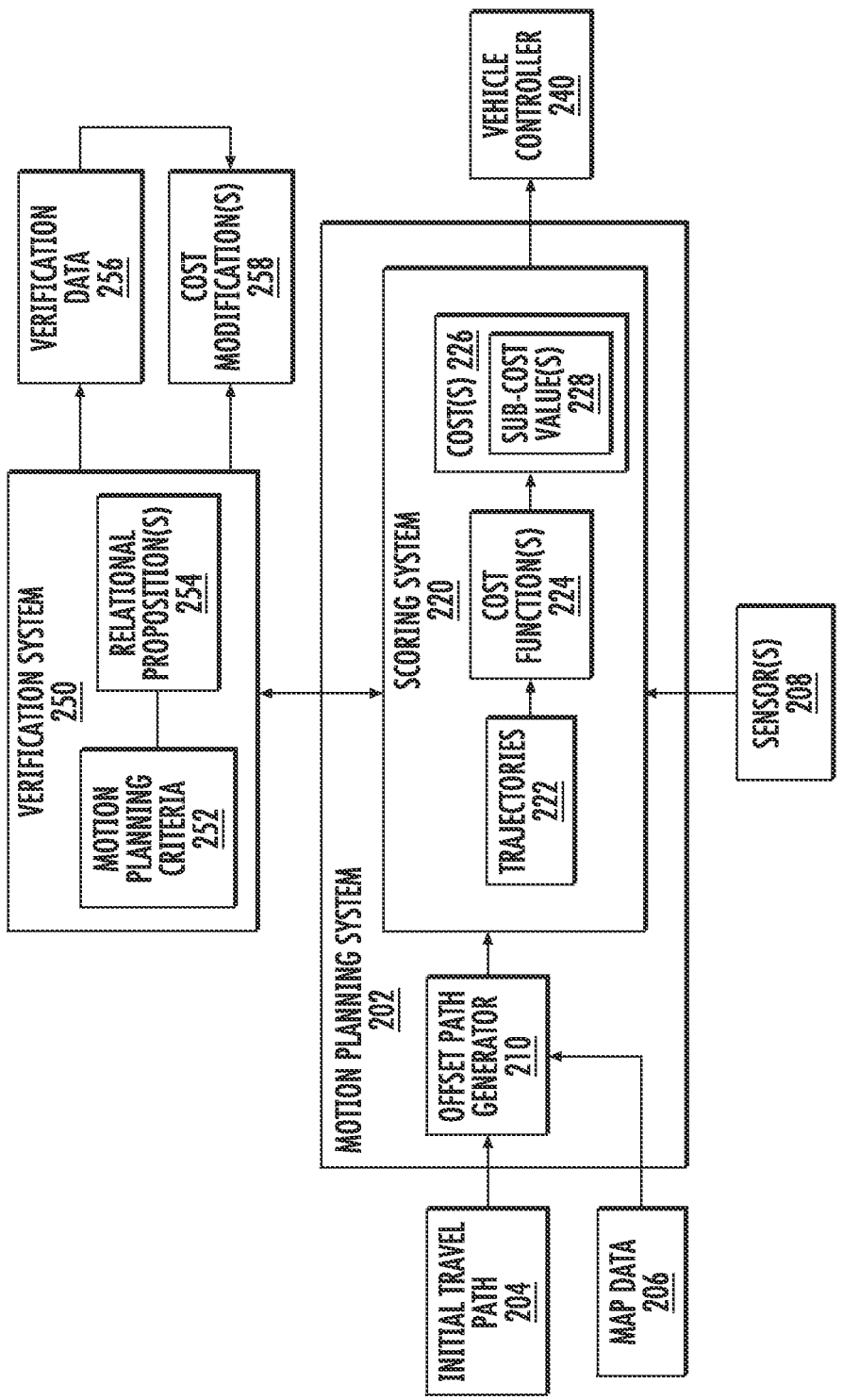
FIG. 2 depicts a block diagram of an example motion planning system according to example embodiments of the present disclosure.

FIG. 2 depicts a block diagram of an example motion planning system 202 according to example embodiments of the present disclosure. The motion planning system 202 (e.g., motion planning system 170C of vehicle computing system 110 as illustrated by FIG. 1) can select a trajectory from a variety of potential trajectories 222 to ensure that the autonomous vehicle is traveling in a safe and comfortable manner. For instance, the motion planning system 202 can be used to provide an improved framework for generating, selecting, and optimizing a trajectory for the autonomous vehicle. To do so, the motion planning system 202 can include and/or have access to an offset path generator 210, a scoring system 220 (e.g., configured to utilize one or more cost function(s) 224), and/or one or more sensor(s) 208. In some examples, the motion planning system 202 may not utilize flat sampling techniques and thus may include an optimizer.

The motion planning system 202 can obtain an initial travel path 204 for an autonomous vehicle from a first location to a second location and/or map data 206 descriptive of one or more road features around the first location, the second location, and/or therebetween. The initial travel path 204 and/or map data 206 can be obtained from a map repository. The initial travel path 204 (e.g., a nominal path) can represent an ideal travel path from the first position to the second position without regard to any objects that may be in the current environment but are not included in existing map data 206. For example, the initial travel path 204 may not take the presence of other moving vehicles into account because the number and position of such objects is constantly changing and can be accounted for by live sensor data.

The initial travel path 204 can be based on the map data 206. For example, map data 206 can include information about a particular geographic location including one or more geographic features including roads, boundaries (e.g., lane boundaries, curbs, etc.), buildings, information about expected traffic patterns, and so on. The initial travel path 204 can be a nominal path for the autonomous vehicle with respect to geographic features such as, for example, a path that maintains the position of the autonomous vehicle within two lane boundaries on a travel way (e.g., lane lines on a road, etc.). In some implementations, the initial travel path 204 can be pre-determined for a particular geographic area and stored (e.g., prior to the vehicle traveling in that area). An initial travel path 204 or nominal path can represent an optimal path through the geographic area when there are no other vehicles or other temporary obstacles.

In some implementations, the data indicative of the initial travel path 204 can be stored offline (by a remote computing system) and can be obtained by the vehicle computing system (e.g., vehicle computing system 112 in FIG. 1). In some implementations, the data indicative of the initial travel path 204 can be encoded as a feature in the map data 206. The initial travel path 204 can be determined in real-time by the autonomous vehicle or a remote computing system as the vehicle is traveling.

The motion planning system 202 can obtain sensor data from one or more sensor(s) 208 describing one or more objects within the surrounding environment of the autonomous vehicle and at least a subset of the object(s) can be positioned along the initial travel path 204. An object may be considered to be positioned along the initial travel path 204 in the event that a least a portion of the object encroaches/overlaps the initial travel path 204 or the outer edge of the object is within a threshold distance from the initial travel path (e.g., 5 ft, 10 ft, 15 ft, 20 ft, etc.). Such object(s) can have higher relevance for planning the motion of the autonomous vehicles than object(s) that do not encroach on the initial travel path 204 or are located beyond the threshold distance. The threshold distance can represent a distance at which the autonomous vehicle (e.g., autonomous vehicle 102 in FIG. 1) may consider a lateral movement away from the object to increase the distance between the autonomous vehicle and the object (e.g., a buffer distance for passing the object). The threshold distance can include, for example, 2 meters while traveling at low speeds or up to 5 meters while traveling at high speeds.

The motion planning system 202 can transmit the initial travel path 204 and map data 206 as input to the offset path generator 210. The offset path generator 210 can generate a plurality of trajectories 222 based, at least in part, on sensor data and the initial travel path 204. As described herein, the plurality of trajectories 222 can be executable trajectories that are dynamically feasible for the autonomous vehicle (and/or a vehicle model). For example, the autonomous vehicle can be capable of controlling its motion to travel to waypoint(s) that define a trajectory. A trajectory can be defined by a spatial path (e.g., x, y, yaw, curvature, etc.) and/or steering quantities (e.g., wrench, twist, steering angle, steering angle velocity, angular velocity, lateral speed, lateral acceleration, lateral jerk, etc.). A trajectory can also be associated with a particular time period (e.g., 5 s, 8 s, 10 s, etc.) that indicates the time for the vehicle may travel along the trajectory's path with the associated parameters (e.g., velocity, acceleration, etc.). The time period can also, or alternatively, be associated with a planning cycle of the motion planning system 202.

Each trajectory can include a velocity profile and a lateral offset profile that are used to describe the position of the autonomous vehicle as it travels and the speed of the autonomous vehicle at different times during the trajectory (e.g., the velocity profile can include acceleration values and the time at which those acceleration values are to be implemented). When generating the plurality of trajectories 222, the offset path generator 210 can determine the velocity profile and the offset profile for each trajectory at least partially based on the detected object(s) and/or the initial travel path 204.

A velocity profile can include data indicating one or more acceleration values and, for each acceleration value, a time at which that acceleration value will be implemented. For instance, a velocity profile can include a representation of a planned acceleration at one or more points in time. Based on this acceleration, a current velocity can be determined at any point in the acceleration. Additionally, or alternatively, the velocity profile can include one or more velocities and a time at which the vehicle will reach those velocities. The velocity profile can also include a vehicle jerk and/or an odometer position. In some examples, the velocity profiles can be generated based on map data including stopping locations such as stop signs, traffic lights, and/or traffic gridlock. The velocity profiles can also be generated based on speed targets associated with a legal speed limit or a velocity target associated with one or more other factors (e.g., measured average traffic velocity for a particular area, etc.).

Additionally, or alternatively, the different types of velocity profiles can be used and/or generated based on the specific characteristics of a given initial travel path 204. For example, a first type of velocity profile can be associated with a situation in which emergency braking is necessary. The velocity profiles of the first type of velocity profile can be constructed using piecewise constant jerk segments (i.e., the velocity profiles can comprise a sequence of cubic polynomials). A second type of velocity profile can be associated with a situation in which a specific speed is the target (e.g., the autonomous vehicle is intending to achieve a particular speed and then coast at that speed). Velocity profiles of the second type can use piecewise constant snap calculations (e.g., the velocity profiles can include a sequence of quartic polynomial functions). A third type of velocity profile can be associated with a situation in which the autonomous vehicle is targeting a speed for a particular distance (e.g., stop signs, traffic lights, gridlock, or the predicted movement of other actors within the environment). Velocity profiles of the third type can use piecewise constant crackle calculations (i.e., the velocity profiles can include a sequence of quintic polynomial functions).

An offset profile for a respective trajectory can include a plurality of offset values. An offset value can represent the distance and direction that the respective trajectory differs from the initial travel path 204 at one or more times during the initial travel path 204. For example, a particular offset value may indicate that at a time 3 seconds into the path, the respective candidate trajectory places the autonomous vehicle 0.7 meters north of the initial travel plan 204. In some implementations, the offset profile can be represented as a line on a graph in which one axis on the graph represents the degree and direction of lateral variation from the initial travel path 204 and the other axis represents time. Each offset profile can be mapped onto the initial travel path 204 to generate one or more trajectories 222. Thus, each trajectory can follow the general path of the initial travel path 204 with one or more lateral adjustments.

The motion planning system 202 can generate a large number of potential trajectories for the vehicle such that most, if not all, possible paths can be represented as a lateral deviation from the initial travel path 204. This allows many additional alternatives to quickly and efficiently be considered, while still maintaining a high degree of safety for the autonomous vehicle. For example, if the initial travel path 204 can be represented as a path through an environment, the offset profile for a particular trajectory can be represented as a path that follows the general route of the initial travel path 204 but is offset laterally from the initial travel path at one or more times, positions, etc. The degree to which the particular trajectory is laterally offset from the initial travel path 204 can be represented as a function of time.

The scoring system 220 can determine one or more cost(s) 226 for each respective trajectory in the plurality of trajectories 222 based on the data obtained from the one or more sensor(s) 208 and/or one or more cost function 224. For instance, the scoring system 220 can score each trajectory against one or more cost function(s) 224 that ensure safe, efficient, and comfortable vehicle motion. A cost function can be encoded for one or more of: the avoidance of object interference, keeping the autonomous vehicle on the travel way/within lane boundaries, preferring gentle accelerations to harsh ones, etc. As further described herein, the cost function(s) 224 can consider vehicle dynamics parameters (e.g., to keep the ride smooth, acceleration, jerk, etc.) and/or map parameters (e.g., speed limits, stops, travel way boundaries, etc.). The cost function(s) 224 can also, or alternatively, take into account at least one of the following object cost(s): interference costs (e.g., cost of avoiding/experience potential interference with objects or infrastructure, minimization of speed, etc.); overtaking buffer (e.g., give 4 ft of space with overtaking a bicycle, etc.); headway (e.g., preserve stopping distance when applying adaptive cruise control motion a moving object, etc.); actor caution (e.g., preserve the ability to stop for unlikely events, etc.); behavioral blocking (e.g., avoid overtaking backed-up traffic in the vehicle's lane, etc.); or other parameters. In some implementations, the cost function(s) 224 can account for fixed buffer and/or speed dependent buffers (e.g., requiring more space for actors when the vehicle is passing at higher speeds, etc.). In some implementations, the cost function(s) 224 can account for map geometry features such as the distance from the initial travel path, the location of lane boundaries, and road boundaries.

The motion planning system 202 can determine an optimal trajectory based on the one or more respective cost(s) 226 for each respective trajectory in the plurality of trajectories 222 and control the motion of the autonomous vehicle (e.g., via communication with the vehicle controller 240) based on the optimal trajectory. As an example, the scoring system 220 can score the plurality of different trajectories 222 (each one having a different offset profile and a different velocity profile). The scoring system 220 can generate one or more cost(s) 226 for each candidate trajectory based on a number of factors. For example, the scoring system 220 can perform object interference detection (e.g., an interference cost function, etc.) to determine a likelihood that a trajectory will cause the autonomous vehicle to interfere with any objects (e.g., travel closer than a certain distance to an object). In the event that the scoring system 220 determines that a trajectory has a chance to interfere with an object, the scoring system 220 (e.g., an interference cost function, etc.) can generate a cost for that particular trajectory. The optimal trajectory can include a trajectory associated with one or more lower cost(s).

By way of example, the scoring system 220 can generate a plurality of sub-cost values 228 for a respective trajectory. Each sub-cost value can be associated with a respective motion planning factor. The scoring system 220 can generate respective cost(s) 226 for the respective trajectory based, at least in part, on one or more of the plurality of sub-cost values 228. Each sub-cost value can be generated based on a corresponding sub-cost function (e.g., of the cost function(s) 224). Each sub-cost function can be configured to evaluate one or more aspects of the respective trajectory for controlling a motion of an autonomous vehicle. For example, each sub-cost function can be configured to generate a respective sub-cost value indicative of the trajectory's impact on one or more motion planning criteria 252. Each sub-cost function can be configured to generate the respective sub-cost value based on sensor data (e.g., received via sensor(s) 208) indicative of a surrounding environment of the autonomous vehicle, a period of time, the trajectory, and/or at least one of the one or more motion planning criteria 252. As an example, the interference sub-cost function can be configured to generate an interference sub-cost value indicative of a likelihood that a respective trajectory can cause vehicle interference (e.g., with one or more objects, etc.) at a respective time.

The motion planning criteria 252 can include criteria for assessing the desirability of a vehicle trajectory. As examples, the motion planning criteria 252 can include progress criteria defining a desirability for a trajectory to move a vehicle along a desired route, interference avoidance criteria defining a desirability for a trajectory to avoid interference (and/or the potential for interference) with the vehicle, road departure criteria defining a desirability for a trajectory to keep the vehicle one or more distances away from a road boundary, lane departure criteria defining a desirability for a trajectory to keep the vehicle one or more distances away from a lane boundary, jerk criteria defining a desirability for a trajectory to minimize sudden turning movements of the vehicle, acceleration/deceleration criteria defining a desirability for a trajectory to minimize sudden stopping or starting movements of the vehicle, stop sign criteria defining a desirability for a trajectory that makes a complete stop in response to a stop sign, and/or any other criteria for ensuring the safe, comfortable, and/or regulatory movement of an autonomous vehicle.

More particularly, the motion planning criteria 252 can include one or more safety criteria and/or one or more secondary criteria. The safety criteria, for example, can include motion planning criteria 252 that can have an impact on roadway safety, whereas the secondary criteria can include motion planning criteria 252 with minimal to no impact on roadway safety. A motion planning criteria's impact of roadway safety can include a measure of a respective criteria's relevance to the safe operation of vehicles on roadways. A motion planning criteria can have an impact of roadway safety in the event that the criteria encourages the selection of vehicle trajectories that follow guidelines such as, for example, remaining within a traffic lane, remaining on a road surface, following speed thresholds, maintaining safe distances between the vehicle and other roadway objects, and/or any other guidelines for safely operating a vehicle. For example, the safety criteria can include a small set of criteria that has a direct or indirect impact on vehicle safety. As an example, the safety criteria can be indicative of interference avoidance, road departure avoidance, and/or lane departure avoidance. By way of example, the safety criteria can include interference avoidance criteria, road departure criteria, and/or lane departure criteria.

The secondary criteria can include any criteria that does not have a direct or significantly impact on vehicle safety. For example, the secondary criteria can include passenger comfort criteria such as criteria for minimizing a sudden movement of the vehicle, etc. The secondary criteria can be indicative of a reward for making progress during a trajectory, negative costs for trajectories with harsh braking, etc. In addition, or alternatively, the secondary criteria can include roadway standard criteria such as stop sign criteria indicative of negative costs for failing to stop at a stop sign, yield at a yield sign, etc. In some implementations, the secondary criteria can be dynamically generated based on historical rider data. For example, the autonomous vehicle can be associated with a ride-sharing platform. In such a case, the secondary criteria can be generated to improve rider experience over time based on rider feedback and/or other historical data.

In some implementations, the criteria can include feasibility criteria. The feasibility criteria can be indicative of a physical feasibility of a trajectory (e.g., feasible turn angle, high steering changes, etc.). In some cases, the vehicle computing system can disregard any trajectory failing any feasibility criteria.

Figure 3:
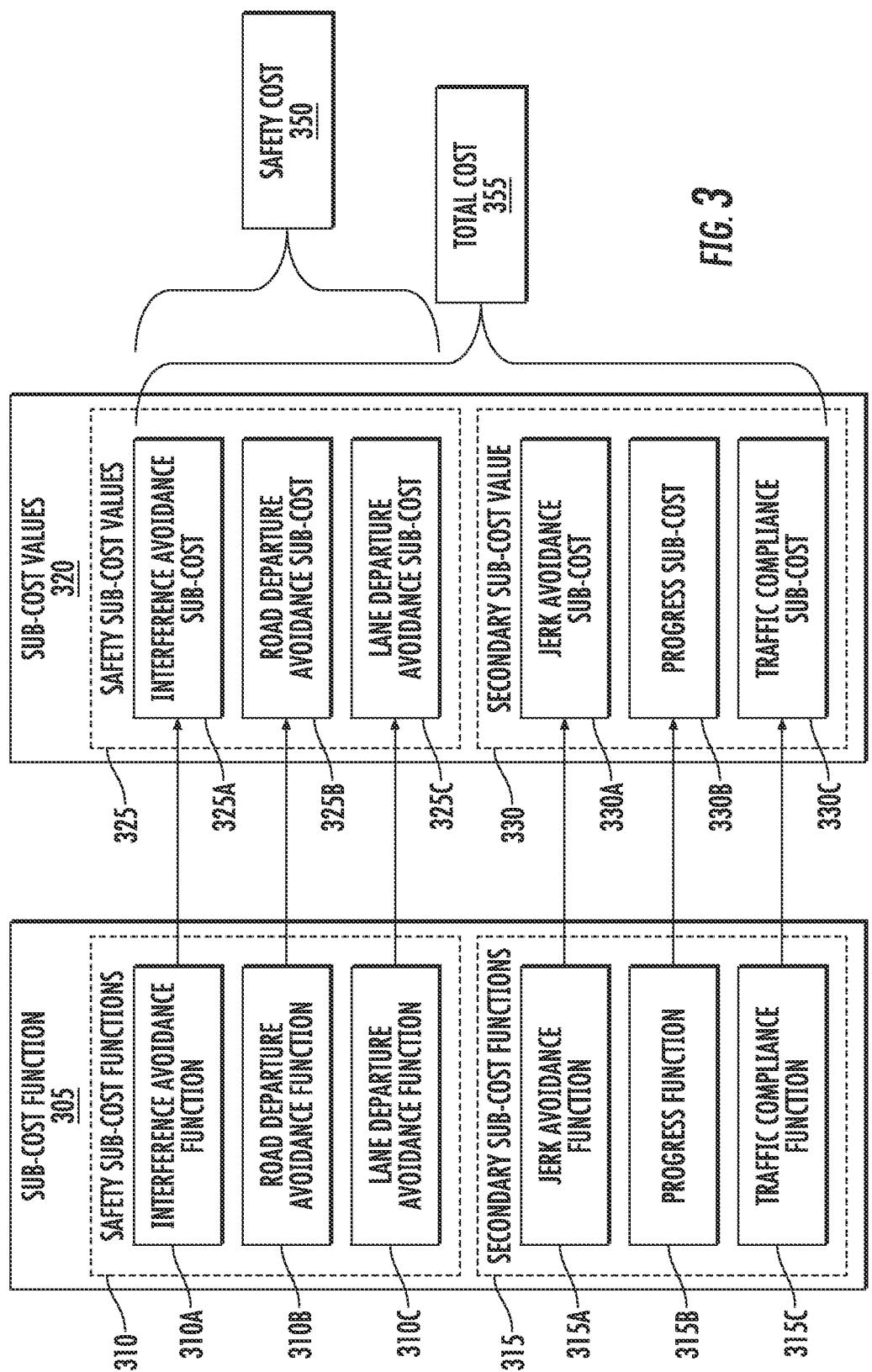
FIG. 3 depicts a plurality of example sub-cost values according to example embodiments of the present disclosure.

Each of the plurality of sub-cost values 228 can represent a respective trajectory's impact on at least one motion planning criteria. By way of example, FIG. 3 depicts a plurality of example sub-cost values according to example embodiments of the present disclosure. For instance, the plurality of sub-cost values 320 can include one or more safety sub-cost values 315 representing a trajectory's impact on at least one safety criteria. The safety sub-cost values 325 can include, for example, an interference avoidance sub-cost 325A representing a trajectory's impact on the interference avoidance criteria. For example, the interference avoidance sub-cost 325A can include a high value in the event that a trajectory has the potential to cause interference with the vehicle and/or a low value in the event that the trajectory does not have the potential to cause interference with the vehicle. In some implementations, an interference avoidance sub-cost 325A can be generated for each time during a trajectory.

As another example, the safety sub-cost values 325 can include a road departure avoidance sub-cost 325B representing a trajectory's impact on the road departure avoidance criteria. The road departure avoidance sub-cost 325B can include a hard road departure sub-cost value and/or a soft road departure sub-cost value. The hard road departure sub-cost value can be indicative of a trajectory's closest distance to a road boundary (e.g., as defined by map data, etc.). The road boundary can be a defined distance from the edge of a roadway. The soft road departure sub-cost value can be indicative of a trajectory's closest distance to a buffer of the road boundary (e.g., a safe distance (e.g., 6 inches, etc.) from the defined road boundary). The hard/soft road departure sub-cost values can include a higher value for trajectories that come close to or exceed the defined road boundary and/or buffer of the defined road boundary.

As yet another example, the safety sub-cost values 310 can include a lane departure avoidance sub-cost 325C representing a trajectory's impact on the lane departure avoidance criteria. The lane departure avoidance sub-cost 325C can be indicative of a trajectory's closest distance to a lane marker. The lane departure avoidance sub-cost 325C can include a higher value for trajectories that come close to or exceed the lane marker.

In addition, or alternatively, the plurality of sub-cost values 320 can include one or more secondary sub-cost values 330 representing a trajectory's impact on secondary criteria. The secondary sub-cost values 330 can include, for example, a jerk avoidance sub-cost 330A representing a trajectory's impact on the jerk criteria. For example, the jerk avoidance sub-cost 330A can include a higher value in the event that a trajectory has the potential to cause a sudden turning movement and/or a lower value in the event that the trajectory does not have the potential to cause a sudden turning movement. In this way, the jerk avoidance sub-cost 330A can encourage the selection of smoother trajectories. As other examples, the secondary sub-cost value(s) 330 can include a progress sub-cost 330B (e.g., a higher value for little progress made towards a destination, a negative or lower value for substantial progress made towards a destination, etc.) representing a trajectory's impact on progress criteria, a traffic compliance sub-cost 330C (e.g., a stop sign compliance sub-cost value (e.g., a higher value for ignoring a stop sign, a lower value for complying with a stop sign, etc.)) representing a trajectory's impact on road sign criteria, and/or any other sub-cost value indicative of a trajectory's impact on passenger comfort and/or road regulations.

Each of the sub-cost values 320 can be generated based on a corresponding sub-cost function (e.g., at least one of sub-cost function(s) 305). For example, the plurality of sub-cost functions 305 can include one or more safety sub-cost functions 310 and/or one or more secondary sub-cost functions 315. The one or more safety sub-cost functions 310 can be configured to generate one or more safety sub-cost values 325 indicative of the trajectory's impact on at least one of the one or more safety criteria. For example, each of the safety sub-cost value(s) 325 can be generated based on a corresponding safety sub-cost function 310 configured to measure a trajectory's impact on road-way safety.

By way of example, a safety sub-cost function can include an interference avoidance function 310A configured to generate an interference avoidance sub-cost 325A based on the respective trajectory's likelihood of causing interference with an object. The interference avoidance function 310A can be configured to obtain sensor data (e.g., perception data, prediction data, etc.) indicative of the surrounding environment (and/or objects therein) of the autonomous vehicle and the offset/velocity profiles of a respective trajectory. Based on this information, the interference avoidance function 310A can determine a probability that the autonomous vehicle will interfere with any object within its surrounding environment during the implementation of the respective trajectory and generate a representative interference avoidance sub-cost 325A.

As another example, a safety sub-cost function can include a road departure avoidance function 310B configured to generate a road departure avoidance sub-cost 325B based on a distance associated with a road boundary and the respective trajectory. The road departure avoidance function 310B can be configured to obtain sensor data (e.g., perception data, prediction data, etc.) indicative of the surrounding environment (e.g., defined road boundaries therein) of the autonomous vehicle and the offset/velocity profiles of a respective trajectory. Based on this information, the road departure avoidance function 310B can determine a probability that the autonomous vehicle will come close to or exceed a defined road boundary and/or buffer distance from a road boundary within its surrounding environment during the implementation of the respective trajectory and generate a representative road departure avoidance sub-cost 325B.

As yet another example, a safety sub-cost function can include a lane departure avoidance function 310C configured to generate a lane departure avoidance sub-cost 325C based on a distance associated with a lane boundary and the respective trajectory. The lane departure avoidance function 310C can be configured to obtain sensor data (e.g., perception data, prediction data, etc.) indicative of the surrounding environment (e.g., defined lane boundaries therein) of the autonomous vehicle and the offset/velocity profiles of the respective trajectory. Based on this information, the lane departure avoidance function 310C can determine a probability that the autonomous vehicle will come close to or exceed a defined lane boundary within its surrounding environment during the implementation of the respective trajectory and generate a representative lane departure avoidance sub-cost 325C.

The secondary sub-cost function(s) 315 can be configured to generate secondary sub-cost value(s) 330 indicative of a trajectory's impact on at least one of the one or more secondary criteria. For example, each of the secondary sub-cost value(s) 330 can be generated based on a corresponding secondary sub-cost function 315 configured to measure a trajectory's impact on passenger comfort.

By way of example, a secondary sub-cost function 315 can include a jerk avoidance function 315A configured to generate a jerk avoidance sub-cost 330A based on an estimated jerk associated with a trajectory. For instance, the jerk avoidance function 315A can be configured to obtain the offset/velocity profiles of the respective trajectory and, based on such information, generate a representative jerk avoidance sub-cost 330A. As another example, a secondary sub-cost function 315 can include a progress function 315B configured to generate a progress sub-cost 330B based on an estimated distance traveled by the trajectory. For instance, the progress function 315B can be configured to obtain the offset/velocity profiles of the respective trajectory and, based on such information, generate a representative progress function 330B. As yet another example, a secondary sub-cost function 315 can include a traffic compliance function 315C configured to generate a traffic compliance sub-cost 330C based on a compliance with one or more road signs and/or other traffic regulations of road segments traveled by the trajectory. For instance, the traffic compliance function 315C can be configured to obtain sensor data (e.g., perception data, prediction data, etc.) indicative of the surrounding environment (e.g., traffic signs, etc. therein) of the autonomous vehicle and the offset/velocity profiles of the respective trajectory and, based on such information, generate a representative traffic compliance sub-cost 330C.

The sub-cost values 320 can be aggregated to determine one or more costs 350, 355 for a trajectory. For example, as described herein with reference to FIG. 6, the one or more safety sub-cost value(s) 325 can be aggregated to determine a safety cost 350 can/or the one or more safety sub-cost value(s) 325 and the one or more secondary sub-cost values 330 can be aggregated to determine a total cost 355.

Figure 4A:
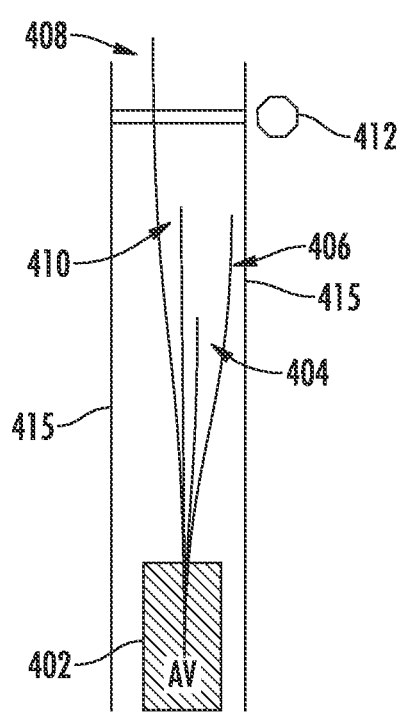
FIG. 4A depicts a graphical representation of a plurality of trajectories near a stopping point according to example embodiments of the present disclosure.

FIG. 4A depicts an example graphical representation of a plurality of trajectories 400 near a stopping point according to example embodiments of the present disclosure. FIG. 4A depicts an autonomous vehicle 402 approaching a stopping point 412 (e.g., a stop sign) within a lane defined by boundaries 415. The autonomous vehicle can analyze (e.g., determine a cost, etc.) a number of trajectories 404, 406, 408, 410 for controlling the movement of the autonomous vehicle as it approaches the stopping point 412. For example, an example trajectory 408 that does not stop before the stopping point 412 can be determined to have a high cost (e.g., based on a high traffic compliance sub-cost). Similarly, an example trajectory 404 that stops well short of the stopping point 412 can be determined to have a high cost (e.g., based on a high progress cost). In another example, an example trajectory 406 that stops a desired distance from the stopping point 412 but approaches a lane boundary 415 of the traffic lane can be determined to have a high cost (e.g., based on a high lane departure avoidance cost). The best trajectory (e.g., the trajectory with the highest/lowest cost) can be an example trajectory 410 that travels as far as possible (e.g., thus having a low progress cost) while still stopping before the stopping point 412 (e.g., thus having a low traffic compliance cost) and staying within the lane boundaries 415 (e.g., thus having a low lane departure avoidance cost).

Figure 4B:
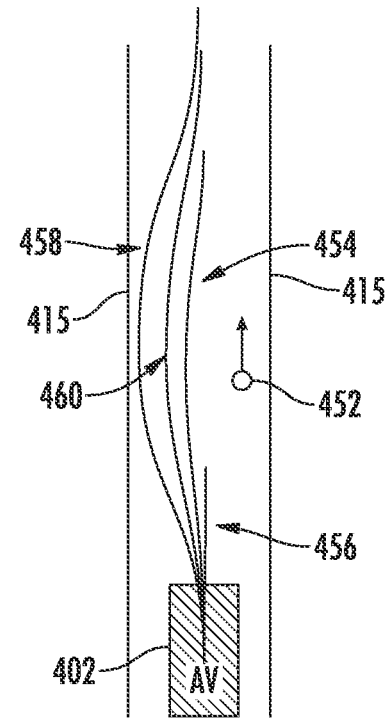
FIG. 4B depicts a graphical representation of a plurality of trajectories near an object according to example embodiments of the present disclosure.

As another example, FIG. 4B depicts an example graphical representation of a plurality of trajectories 450 within a proximity to an object according to example embodiments of the present disclosure. FIG. 4B depicts an autonomous vehicle 402 within a lane defined by boundaries 415 proximate to an object 452. The autonomous vehicle can analyze (e.g., determine a cost, etc.) a number of trajectories 454, 456, 458, 460 for controlling the movement of the autonomous vehicle as it passes the object 452. For example, an example trajectory 456 that does not stop before the stopping point 412 can be determined to have a high cost (e.g., based on a high traffic compliance sub-cost). The cost for a particular trajectory can be generated based, at least in part, on the spatial relationship between the particular trajectory and the other objects in the environment, including but not limited to other vehicles, buildings, signs, pedestrians, and so on. For example, if the object 452 includes a bicycle, the trajectory can be scored such that if an example trajectory passes within a buffer distance, the cost can be high (e.g., based on a high interference avoidance cost). Similarly, an example trajectory 458 that approaches a lane boundary 415 can have a high generated cost (e.g., based on a high lane departure avoidance cost). An example trajectory 454 that passes close enough to the object 452 that the speed must be reduced to pass safely may have a cost that is heightened because the autonomous vehicle will travel less distance during the given time frame (e.g., based on a high progress cost and/or a high interference avoidance cost, etc.). In addition, or alternatively, if an example trajectory 456 does not swerve around the object 452, the trajectory speed can be limited to the speed of the bicycle 452 so that no collision occurs. Such an example trajectory 456 can have a higher cost value (e.g., based on a high progress cost) because the autonomous vehicle 402 will travel much less distance than a trajectory that can swerve around the object 452. An optimal example trajectory 460 can be a trajectory that veers around the object 452 far enough (e.g., thus having a low interference avoidance cost) so that it does not have to slow its speed (e.g., thus having a low progress cost) but not so far that it approaches a lane boundary 415 (e.g., thus having a low lane departure avoidance cost).

FIG. 5, for example, depicts representations of a buffer distance associated with an object according to example embodiments of the present disclosure. In some implementations, the motion planning system (e.g., motion planning system 202 in FIG. 2) can determine a buffer distance 506 that an autonomous vehicle 502 maintains from other objects 504 that are detected. For example, the buffer distance 506 can be determined based on the speed of the autonomous vehicle 502. For instance, if the autonomous vehicle 502 is traveling at a relatively slow speed (e.g., 5 mph), the buffer distance 506 from the other object 504 can be relatively small. The relative buffer distance 506 can be determined based on a predefined algorithm that determines a buffer distance based on the speed of the autonomous vehicle, the object (and type thereof) to be passed, the type of travel way, the number of lanes available, and so on. Alternatively, the buffer distance 506 can be determined by a machine-learned model, trained to select a buffer distance that maintains safety while also ensuring that the autonomous vehicle travels quickly. In another example, a series of buffer distances can be precalculated and stored in a database for reference.

Similarly, as the speed of the autonomous vehicle 502 increases, the buffer distance 508 can also increase. Thus, a trajectory that is not within a buffer distance 504 at a first speed, may violate the buffer distance 508 if the speed of the autonomous vehicle 502 is increased.

Turning back to FIG. 2, in some implementations, the scoring system 220 can be configured to cost trajectories in order to prioritize roadway safety criteria over other motion planning criteria. For example, the plurality of cost functions 224 can be generated and/or verified (onboard the vehicle and/or offboard the vehicle) against one or more relational proposition(s) 254 indicative of a desired relationship (e.g., to emphasize safety) between one or more of the cost function(s) 224. More particularly, the cost functions 224 can be generated and/or verified by a verification system 250 onboard (e.g., the vehicle computing system) and/or offboard (e.g., remote computing systems) the autonomous vehicle. The verification system 250 can obtain a plurality of sub-cost functions (e.g., functions 224) and compare the plurality of sub-cost functions 224 to a number of relational propositions 254 associated with the plurality of sub-cost functions 224 to determine whether the sub-cost functions 224 achieve safety standards (and/or any other motion planning standards) for operating an autonomous vehicle.

The relational propositions 254 can express desired relationships between a number of sub-cost functions 224 and/or motion planning criteria 252 associated therewith. For example, each relational proposition can be indicative of a desired relationship between at least two of the plurality of sub-cost functions 224. The relational propositions 254 can identify a desired priority and/or hierarchical relationship between the plurality of sub-cost functions 224. By way of example, the relational propositions 254 can include functions designed to output a boolean value (e.g., true/false) indicative of whether the plurality of sub-cost functions 224 satisfy a plurality of desired priorities and/or hierarchical relationships. In this way, the relational propositions 254 can document a plurality of tradeoffs between a plurality of motion planning criteria 252.

For instance, a first relational proposition can express a desired relationship for sub-cost functions associated with lane departure avoidance criteria (e.g., a lane departure avoidance function) to take priority over sub-cost functions associated with passenger convenience (e.g., a jerk avoidance function). In addition, or alternatively, a second relational proposition can express a desired relationship for sub-cost functions associated with interference avoidance criteria (e.g., an interference avoidance function) to take priority over sub-cost functions associated with passenger convenience (e.g., a jerk avoidance function) and lane departure avoidance criteria (e.g., a lane departure avoidance function). In some implementations, at least one of the relational proposition(s) 254 can identify a safety relationship between each of the one or more safety sub-cost functions and the one or more secondary sub-cost functions. The safety relationship, for example, can define a requirement that each of the one or more safety sub-cost values generated by the one or more safety sub-cost functions outweigh any combination of the one or more secondary sub-cost values generated by the one or more secondary sub-cost functions.

The verification system 250 can generate verification data 256 indicative of whether the plurality of sub-cost functions 224 achieve the relational proposition(s) 254 based on the plurality of sub-cost functions 224 (e.g., functions to be used in the operation of the autonomous vehicle) and/or the one or more relational propositions 254 (e.g., approved relational propositions). For instance, the verification system 250 can compare the one or more relational propositions 254 to the plurality of sub-cost functions 224 to validate the sub-cost functions 224. For example, the verification system 250 can simulate one or more simulated values generated by the plurality of sub-cost functions 224 by applying the plurality of sub-cost functions 224 to one or more testing motion plan(s) (e.g., simulated motion plan(s), predetermined motion plan(s), etc.). The verification system 250 can validate the plurality of sub-cost functions 224 by comparing the respective simulated values (e.g., sub-cost value(s) 228) of each of the sub-cost functions 224 with respect to the relational proposition(s) 254.

The verification system 250 can provide for display, via one or more display devices, the verification data 256. The verification data 256 can be indicative of a success or failure of each of the relational proposition(s) 254. In the event of a failure, the verification data 250 can indicate that the plurality of sub-cost functions 224 do not achieve the one or more relational propositions 254. For example, the verification system 250 can determine at least one deviating relational proposition of the one or more relational proposition(s) 254. The at least one deviating relational proposition can be indicative of at least one of the one or more relational propositions 254 that is not achieved by the plurality of sub-cost functions 224 (e.g., one or more simulated values of the plurality of sub-cost functions 224).

In some implementations, the verification system 250 can generate one or more cost modifications 258 for the plurality of sub-cost functions 224 based, at least in part, on the one or more relational propositions 254. For example, the verification system 250 can include an offline tool configured to generate one or more different weights, parameters, etc. for one or more of the sub-cost functions 224. The one or more different weights, parameters, etc. can be applied to the plurality of sub-cost functions 224 to satisfy the one or more relational proposition(s) 254. In this way, the verification system 250 can automatically generate sub-cost functions 224 based on the relational propositions 254. The automatic generation of sub-cost functions 224 can be designed as a linear programming problem, the solution of which can include a set of weights and/or parameters for the plurality of sub-cost functions 224 that satisfy each of the one or more relational propositions 254. In some implementations, the verification system 250 can generate the one or more cost modifications 258 in response to verification data 256 identifying at least one deviating relational proposition. The one or more cost modification(s) 258 for the plurality of sub-cost functions 224 can be based, at least in part, on the at least one deviating relational proposition.

In some implementations, the verification system 250 can obtain user input indicative of a costing change to at least one of the plurality of sub-cost functions 224 and/or the one or more relational propositions 254. In such a case, the verification system 250 can generate the verification data 256 based on the costing change. For example, the costing change can include an additional sub-cost function in addition to the plurality of sub-cost functions 224. The verification system 250 can generate the one or more cost modifications 258 for the plurality of sub-cost functions 224 based on the additional sub-cost function. As another example, the costing change can include an additional relational proposition in addition to the one or more relational propositions 254. The verification system 250 can generate the one or more cost modifications 258 for the plurality of sub-cost functions 224 based on the additional relational proposition.

In some cases, the verification system 250 can validate the plurality of sub-cost functions 224 with respect to the one or more relational proposition(s) 254 each time a change is made to a vehicle computing system (e.g., vehicle computing system 110 of FIG. 1). For example, the verification system 250 can automatically generate verification data 256 in response to code changes (e.g., a code change is checked-in, during compilation, etc.) and/or before each new software release. As another example, the plurality of sub-cost functions 224 can be preloaded (e.g., cached) on the one or more tangible, non-transitory, computer readable media of an autonomous vehicle (e.g., vehicle computing system). In such a case, the verification system 250 can obtain start-up data indicative of a start-up operation for the autonomous vehicle and, in response to obtaining the start-up data, generate verification data 256 for the plurality of sub-cost functions 224. The start-up operation, for example, can indicate that the autonomous vehicle has been powered on for operation, has gone online with a ride-sharing network, has entered an autonomous driving mode, and/or has otherwise become active. The autonomous vehicle can perform one or more vehicle actions in response to the verification data 256 (e.g., disable autonomy capabilities based on verification data 256 indicative of a failure, enable autonomy capabilities in response to a success, etc.).

Figure 6:
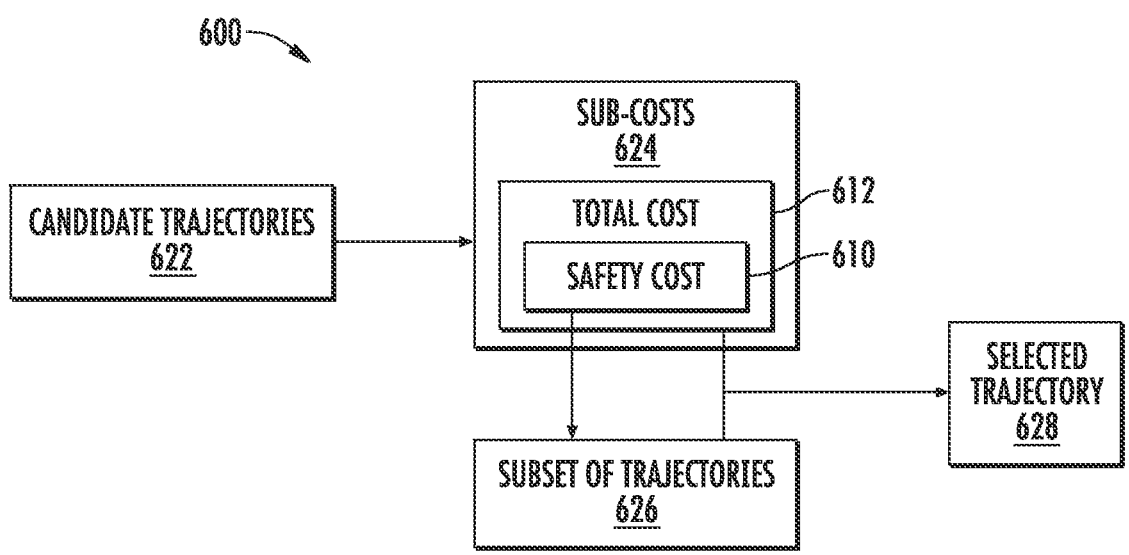
FIG. 6 depicts a block diagram of an example cost calculation system according to example embodiments of the present disclosure.

FIG. 6 depicts a block diagram of an example trajectory generation, evaluation, and selection system 600 according to example embodiments of the present disclosure. In some examples, the trajectory generation and selection system 600 includes a plurality of steps, each step performing a particular process that is part of generating costs for a plurality of trajectories. The trajectory generation, evaluation, and selection system 600 can be included remote from an autonomous vehicle (e.g., on remote computing system(s) 190B, operations computing system 190A, etc.) and/or onboard the autonomous vehicle (e.g., vehicle computing system 110). For example, in some implementations, the trajectory generation and selection system 600 can be included (e.g., stored, etc.) with a motion planning system (e.g., motion planning system 175C, motion planning system 202, etc.) onboard an autonomous vehicle.

The trajectory generation and selection system 600 can be configured to generate a plurality of candidate trajectories 622 to be evaluated. For example, the trajectory generation and selection system 600 can access an initial travel path (e.g., initial travel path 204) from a map repository and/or a path repository. The trajectory generation, evaluation, and selection system 600 can generate the plurality of candidate trajectories 622 based on the initial travel path. For instance, each candidate trajectory can be generated programmatically by applying a series of offsets to the initial travel path. An offset can include information describing both the variation in position (e.g., a series of direction and degree offset values that describe the degree to which the respective candidate trajectory varies from the initial travel path) and velocity. In some examples, the trajectory generation and selection system 600 can generate a candidate trajectory for each possible offset given an initial set of possible offsets.

In some examples, once the plurality of candidate trajectories 622 have been generated, the trajectory generation and selection system 600 can generate a plurality of sub-costs 624 for each candidate trajectory. The sub-costs 624 for a particular candidate trajectory can be based on an evaluation of the specific trajectory (e.g., as illustrated with reference to FIG. 3). In some examples, the trajectory generation and selection system 600 can determine whether the specific candidate trajectory will result in an interference with another object (e.g., a vehicle, a stationary object, and so on). In some examples, the trajectory generation and selection system 600 can remove candidate trajectories that result in a possible interference from consideration or give such candidate trajectories a very high cost, such that it will not be selected unless no other trajectories are possible.

In some examples, the trajectory generation and selection system 600 can generate sub-costs 624 such that candidate trajectories that are more similar to the initial travel path are assigned lower costs than candidate trajectories that are less similar to the initial travel path, all other things being equal. In addition, candidate trajectories that are smoother (e.g., fewer turns, fewer changes in acceleration and speed, and so on) receive lower-cost scores than candidate trajectories that are less smooth. Furthermore, candidate trajectories that travel a route more quickly and/or efficiently can also receive a lower cost value.

The sub-costs 624 can be generated based on motion planning criteria. For instance, each sub-cost value can be determined based on an evaluation of the trajectory's impact on motion planning criteria. In some implementations, the trajectory generation and selection system 600 can be configured to prioritize roadway safety over other motion planning criteria during the selection of the plurality of trajectories 622. For example, the cost for a particular trajectory can be generated based on the degree to which the trajectory follows established criteria for evaluating trajectories. For example, if the environment includes a stop point (e.g., a stop sign), a trajectory that does not stop before the stop point can be determined to have a high cost. Similarly, a trajectory that stops well short of the stop point may be determined to have a high cost. In some examples, the best trajectory can be a trajectory that travels as far as possible while still stopping before the stop point. In another example, a trajectory that leaves the current lane of the autonomous vehicle will have a high cost (e.g., a lane boundary violation cost).

In some implementations, the trajectory generation and selection system 600 can determine costs (e.g., sub-costs 624) for a trajectory based on the plurality of sub cost functions. For example, the trajectory generation and selection system 600 can generate a cost (or sub-cost value of a cost) for a particular trajectory based on the degree to which it complies with the motion planning criteria. A lower cost score can represent a more preferable trajectory. The trajectory generation and selection system 600 can select a trajectory for the autonomous vehicle based on the determined costs 624 for each respective trajectory. By way of example, once all of the potential trajectories have been scored to generate an associated cost, the trajectory generation and selection system 600 can select the trajectory that has the lowest calculated cost.

In some implementations, the trajectory generation and selection system 600 can be configured to select a trajectory that does not violate any safety-related constraints. The selected trajectory 628 can include the trajectory with the best trade-offs between risk and performance. For example, instead of picking the trajectory with the lowest score, the trajectory generation and selection system 600 can first select a subset of trajectories 626 with a lowest safety score and select a trajectory 628 from the subset of trajectories 626 for implementation.

For example, the trajectory generation and selection system 600 can generate one or more respective costs 624 for each respective trajectory of the plurality of trajectories 622. The one or more respective costs 624 can include a safety cost 610 and a total cost 612. The respective cost(s) 610, 612 for each respective trajectory can be generated based on a plurality of sub-cost values. The safety cost 610 for the respective trajectory can be generated based on an aggregation of the one or more safety sub-cost values for the respective trajectory. The total cost 612 for the respective trajectory can be generated based on an aggregation of the plurality of sub-cost values for the respective trajectory.

The trajectory generation and selection system 600 can determine a subset of trajectories 626 from the plurality of trajectories 622 based on the safety cost 610 associated with each trajectory of the plurality of trajectories 622. The trajectory generation and selection system 600 can determine a minimal safety cost for the plurality of trajectories 622 based on the safety cost 610 associated with each trajectory of the plurality of trajectories 622. The trajectory generation and selection system 600 can determine the subset of trajectories 626 based on the minimal safety cost. For instance, each trajectory of the subset of trajectories 626 can be associated with a respective safety cost that achieves the minimal safety cost. The trajectory generation and selection system 600 can determine an optimal trajectory 628 from the subset of trajectories 626 based on the total cost 612 associated with each trajectory of the subset of trajectories 626.

In this way, the trajectory generation and selection system 600 can utilize a tiered approach to trajectory costing and selection. The trajectory generation and selection system 600 can aggregate all safety related sub costs (e.g., most critical safety related sub costs such as interference avoidance sub cost, road departure avoidance sub cost, lane departure avoidance sub cost, etc.). The trajectory generation and selection system 600 can generate a safety score (e.g., safety cost 610) based on the aggregation of all safety related sub costs. The trajectory generation and selection system 600 can determine a minimum safety score and identify a subset of trajectories 626 that share the minimum safety score (e.g., within a defined range). And, the trajectory generation and selection system 600 can select a trajectory 628 with the lowest total cost from the subset of trajectories 626 for implementation.

Turning back to FIG. 2, the motion planning system 202 can provide data to the vehicle controller 240 to initiate the motion of the autonomous vehicle in accordance with a selected trajectory. In this way, the motion planning system 202 can control the motion of the autonomous vehicle based on the selected trajectory. For instance, once a trajectory has been chosen, the motion planning system 202 can transmit the motion to a vehicle controller 240. The vehicle controller 240 can use the selected trajectory to generate one or more motion controls for the autonomous vehicle. By way of example, the vehicle controller 240 can translate a trajectory into instructions for controlling the autonomous vehicle including adjusting the steering of the vehicle "X" degrees, adjusting a throttle for speed, and/or applying a certain magnitude of braking force. The vehicle controller 240 can transmit those motion controls to the autonomous vehicle to be executed and follow the selected trajectory.

Figure 7:
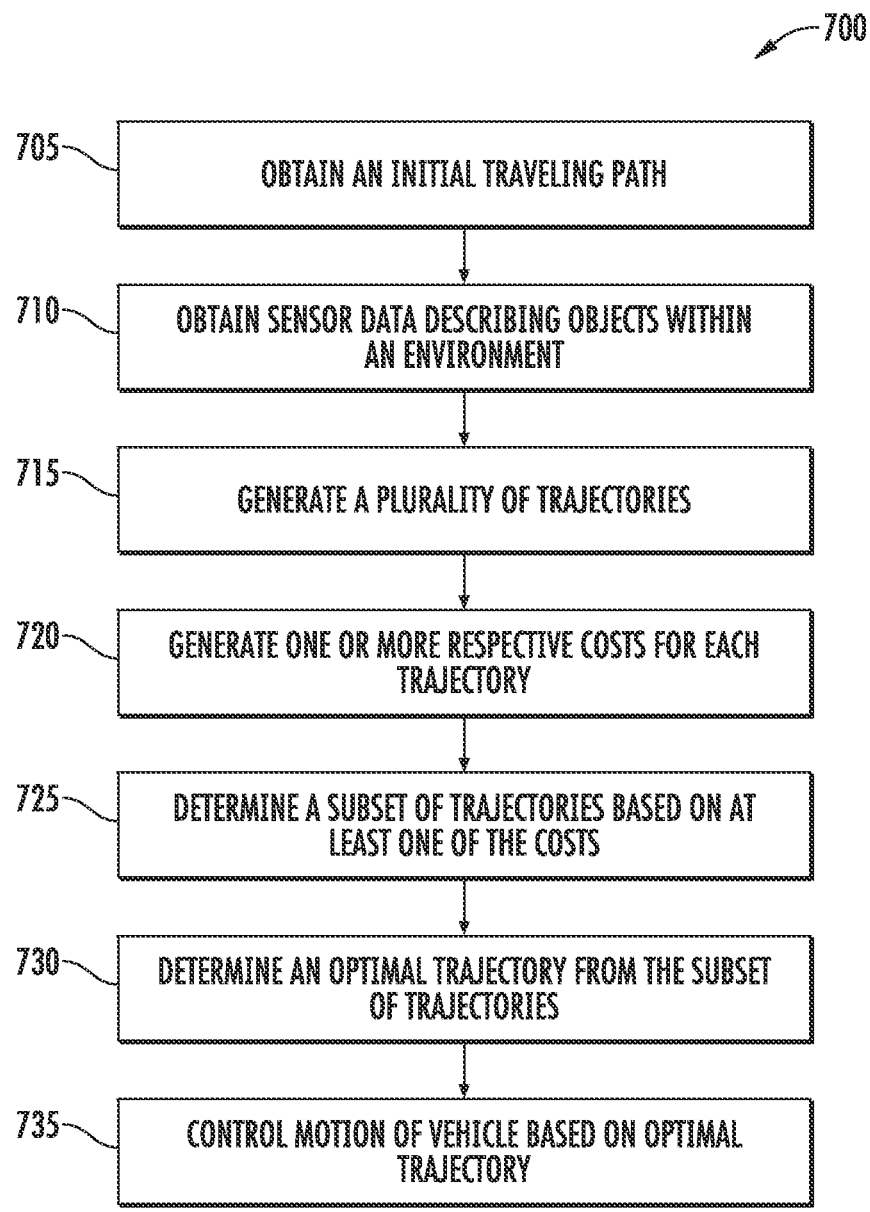
FIG. 7 depicts a flow chart diagram of an example method for generating an optimal trajectory according to example embodiments of the present disclosure.

FIG. 7 depicts a flow chart diagram of an example method 700 for generating an optimal trajectory according to example embodiments of the present disclosure. One or more portion(s) of the method 700 can be implemented by a computing system that includes one or more computing devices such as, for example, the computing systems described with reference to the other figures (e.g., vehicle computing system 110, motion planning system 170C, motion planning system 202, trajectory generation and selection system 600, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1, 2, 6, 9-10, etc.), for example, to generate an optimal trajectory for vehicle motion planning. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 705, the method 700 can include obtaining an initial travel path. For example, a computing system (e.g., vehicle computing system 110, motion planning system 170C, motion planning system 202, trajectory generation and selection system 600, etc.) can obtain the initial travel path. For instance, the computing system can obtain an initial travel path for an autonomous vehicle from a first location to a second location.

At 710, the method 700 can include obtaining sensor data describing objects within an environment. For example, the computing system (e.g., vehicle computing system 110, motion planning system 170C, motion planning system 202, trajectory generation and selection system 600, etc.) can obtain the sensor data describing objects within the environment. For instance, the computing system can obtain sensor data describing one or more objects within an environment of the autonomous vehicle. The one or more objects can be positioned along the initial travel path.

At 715, the method 700 can include generating a plurality of trajectories. For example, the computing system (e.g., vehicle computing system 110, motion planning system 170C, motion planning system 202, trajectory generation and selection system 600, etc.) can generate the plurality of trajectories. For instance, the computing system can generate a plurality of trajectories for the autonomous vehicle based, at least in part, on the sensor data and the initial travel path.

At 720, the method 700 can include generating one or more respective costs for each trajectory. For example, the computing system (e.g., vehicle computing system 110, motion planning system 170C, motion planning system 202, trajectory generation and selection system 600, etc.) can generate the one or more respective costs for each trajectory. For instance, the computing system can generate one or more respective costs for each respective trajectory of the plurality of trajectories. The one or more respective costs can include a safety cost and a total cost.

At 725, the method 700 can include determining a subset of trajectories based on at least one of the costs. For example, the computing system (e.g., vehicle computing system 110, motion planning system 170C, motion planning system 202, trajectory generation and selection system 600, etc.) can determine the subset of trajectories based on at least one of the costs. For instance, the computing system can determine a subset of trajectories from the plurality of trajectories based, at least in part, on the safety cost associated with each trajectory of the plurality of trajectories.

At 730, the method 700 can include determining an optimal trajectory from the subset of trajectories. For example, the computing system (e.g., vehicle computing system 110, motion planning system 170C, motion planning system 202, trajectory generation and selection system 600, etc.) can determine the optimal trajectory from the subset of trajectories. For instance, the computing system can determine an optimal trajectory from the subset of trajectories based, at least in part, on the total cost associated with each trajectory of the subset of trajectories.

At 735, the method 700 can include controlling motion of a vehicle based on the optimal trajectory. For example, the computing system (e.g., vehicle computing system 110, motion planning system 170C, motion planning system 202, trajectory generation and selection system 600, etc.) can control the motion of the vehicle based on the optimal trajectory. For instance, the computing system can control the motion of the autonomous vehicle based, at least in part, on the optimal trajectory.

Figure 8:
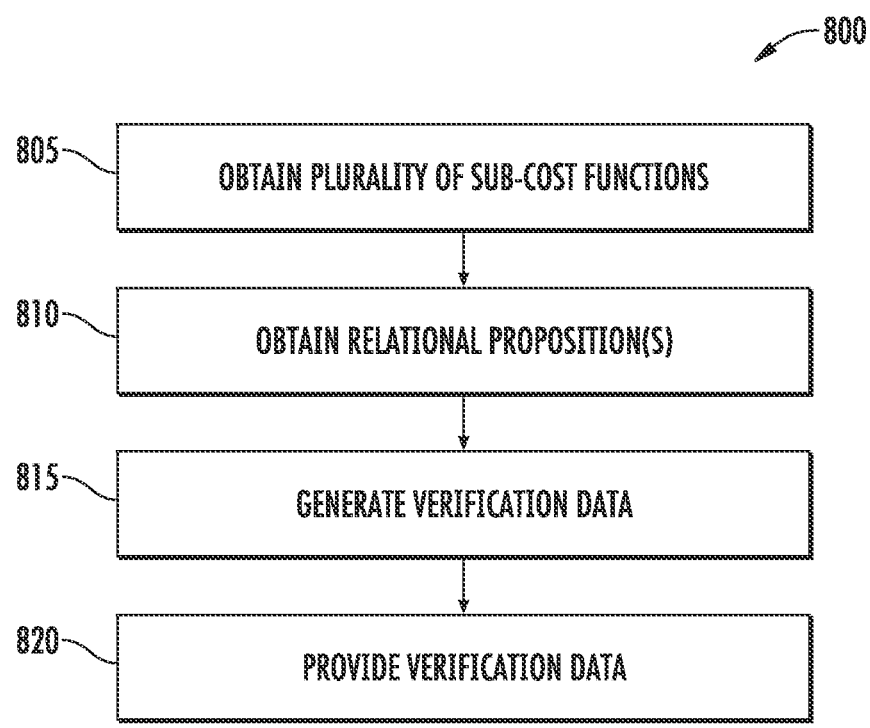
FIG. 8 depicts a flow chart diagram of an example method for verifying sub-cost functions designed to cost vehicle trajectories according to example embodiments of the present disclosure.

FIG. 8 depicts a flow chart diagram of an example method 800 for verifying sub-cost functions designed to cost vehicle trajectories according to example embodiments of the present disclosure. One or more portion(s) of the method 800 can be implemented by a computing system that includes one or more computing devices such as, for example, the computing systems described with reference to the other figures (e.g., vehicle computing system 110, remote computing system(s) 190B, operations computing system 190A, motion planning system 202, verification system 250, trajectory generation and selection system 600, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1, 2, 6, 9-10, etc.), for example, to verify sub-cost functions designed to cost vehicle trajectories. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 805, the method 800 can include obtaining a plurality of sub-cost functions. For example, a computing system (e.g., vehicle computing system 110, remote computing system(s) 190B, operations computing system 190A, motion planning system 202, verification system 250, trajectory generation and selection system 600, etc.) can obtain the plurality of sub-cost functions. For instance, the computing system can obtain a plurality of sub-cost functions configured to evaluate a trajectory for controlling a motion of an autonomous vehicle. Each sub-cost function can be configured to generate a respective sub-cost value indicative of the trajectory's impact on one or more motion planning criteria. Each sub-cost function can be configured to generate the respective sub-cost value based, at least in part, on sensor data indicative of a surrounding environment of the autonomous vehicle, a period of time, and the trajectory.

At 810, the method 800 can include obtaining relational propositions. For example, the computing system (e.g., vehicle computing system 110, remote computing system(s) 190B, operations computing system 190A, motion planning system 202, verification system 250, trajectory generation and selection system 600, etc.) can obtain the relational propositions. For instance, the computing system can obtain one or more relational propositions associated with the plurality of sub-cost functions. Each relational proposition can be indicative of a desired relationship between at least two of the plurality of sub-cost functions.

At 815, the method 800 can include generating verification data. For example, the computing system (e.g., vehicle computing system 110, remote computing system(s) 190B, operations computing system 190A, motion planning system 202, verification system 250, trajectory generation and selection system 600, etc.) can generate the verification data. For instance, the computing system can generate verification data indicative of whether the plurality of sub-cost functions achieve the one or more relational propositions based, at least in part, on the plurality of sub-cost functions and the one or more relational propositions.

At 820, the method 800 can include providing verification data. For example, the computing system (e.g., vehicle computing system 110, remote computing system(s) 190B, operations computing system 190A, motion planning system 202, verification system 250, trajectory generation and selection system 600, etc.) can provide the verification data. For instance, the computing system can provide for display, via one or more display devices, the verification data.

Figure 9:
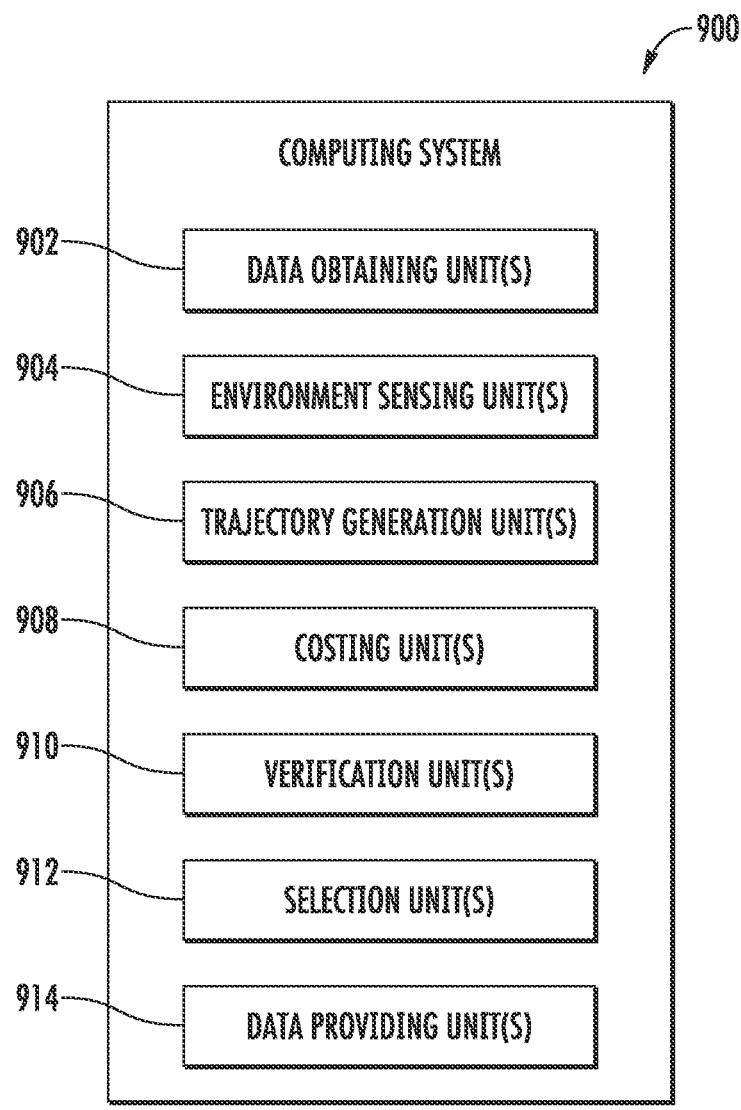
FIG. 9 depicts an example system with units for performing operations and functions according to example aspects of the present disclosure.

Various means can be configured to perform the methods and processes described herein. For example, FIG. 9 depicts example units associated with a computing system for performing operations and functions according to example embodiments of the present disclosure. FIG. 9 depicts a computing system 900 that can include, but is not limited to, data obtaining unit(s) 902, verification unit(s) 904, data providing unit(s) 906, and/or other means for performing the operations and functions described herein. In some implementations one or more units may be implemented separately. In some implementations, one or more units may be included in one or more other units.

In some implementations, one or more of the units may be implemented separately. In some implementations, one or more units may be a part of or included in one or more other units. The means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s) 902, etc.) can be configured to obtain a plurality of sub-cost functions configured to evaluate a trajectory for controlling a motion of an autonomous vehicle. Each sub-cost function can be configured to generate a respective sub-cost value indicative of the trajectory's impact on one or more motion planning criteria. Each sub-cost function can be configured to generate the respective sub-cost value based, at least in part, on sensor data indicative of a surrounding environment of the autonomous vehicle, a period of time, and/or the trajectory. In addition, or alternatively, the means (e.g., data obtaining unit(s) 902, etc.) can be configured to obtain one or more relational propositions associated with the plurality of sub-cost functions. Each relational proposition can be indicative of a desired relationship between at least two of the plurality of sub-cost functions. The means (e.g., verification unit(s) 910, etc.) can be configured to generate verification data indicative of whether the plurality of sub-cost functions achieve the one or more relational propositions based, at least in part, on the plurality of sub-cost functions and the one or more relational propositions. And, the means (e.g., data providing unit(s) 914, etc.) can be configured to provide for display, via one or more display devices, the verification data.

In some implementations, the means (e.g., data obtaining unit(s) 902, etc.) can be configured to obtain an initial travel path for an autonomous vehicle from a first location to a second location. The means (e.g., environment sensing unit(s) 904, etc.) can be configured to obtain sensor data describing one or more objects within an environment of the autonomous vehicle. The one or more objects can be positioned along the initial travel path. The means (e.g., trajectory generation unit(s) 906, etc.) can be configured to generate a plurality of trajectories for the autonomous vehicle based, at least in part, on the sensor data and the initial travel path. The means (e.g., costing unit(s) 908, etc.) can be configured to generate one or more respective costs for each respective trajectory of the plurality of trajectories. The one or more respective costs can include a safety cost and a total cost. The means (e.g., selection unit(s) 912, etc.) can be configured to determine a subset of trajectories from the plurality of trajectories based, at least in part, on the safety cost associated with each trajectory of the plurality of trajectories. The means (e.g., selection unit(s) 912, etc.) can be configured to determine an optimal trajectory from the subset of trajectories based, at least in part, on the total cost associated with each trajectory of the subset of trajectories. The means (e.g., data providing unit(s), 914) can be configured to control the motion of the autonomous vehicle based, at least in part, on the optimal trajectory.

Figure 10:
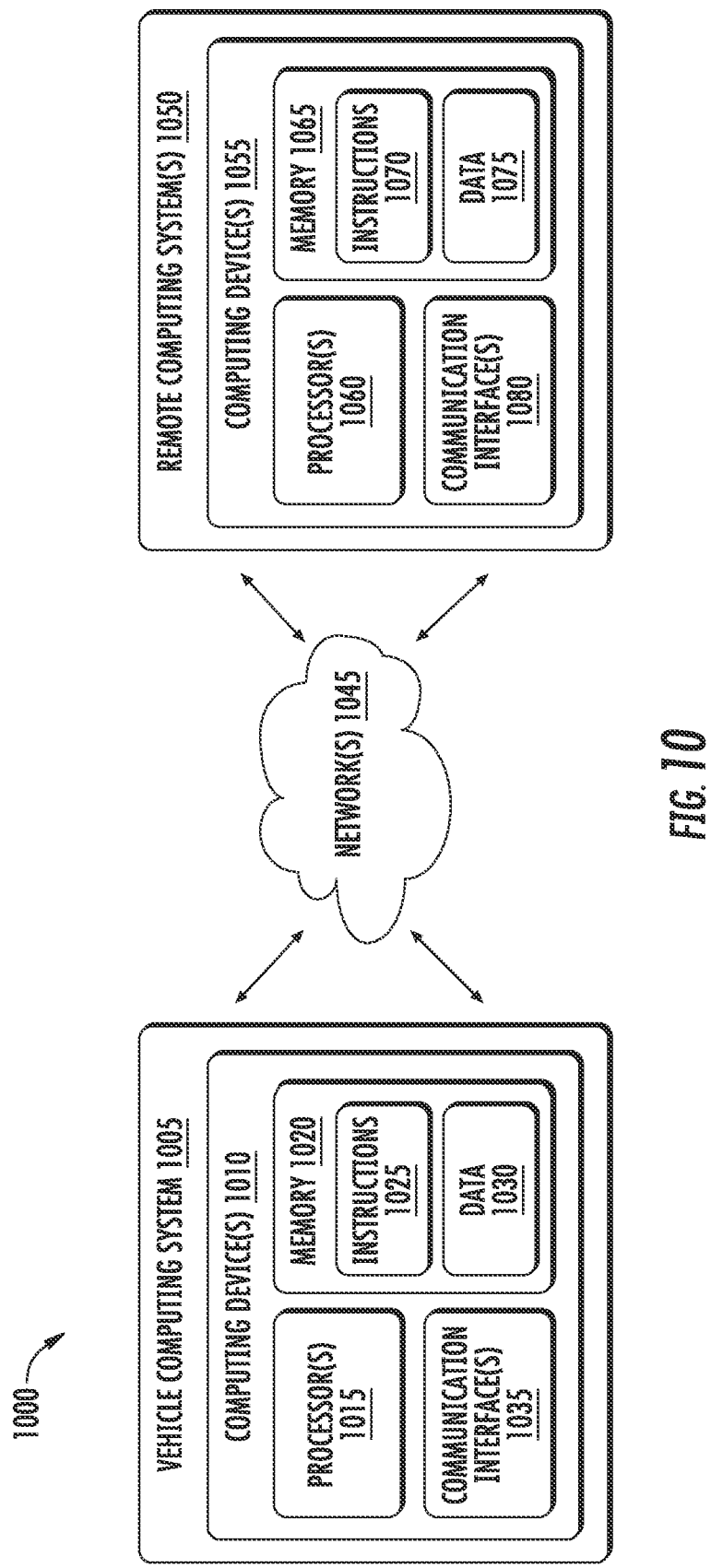
FIG. 10 depicts example system components according to example aspects of the present disclosure.

FIG. 10 depicts example system components of an example system 1000 according to example embodiments of the present disclosure. The example system 1000 can include the computing system 1005 (e.g., vehicle computing system 112, motion planning system 202, one or more vehicle devices, etc.) and the computing system 1050 (e.g., operations computing system 190A, remote computing devices 190B, verification system 250, etc.), etc. that are communicatively coupled over one or more network(s) 1045.

The computing system 1005 can include one or more computing device(s) 1010. The computing device(s) 1010 of the computing system 1005 can include processor(s) 1015 and a memory 1020. The one or more processors 1015 can be any suitable processing device (e.g., a processor core, a microprocessor, an ASIC, a FPGA, a controller, a microcontroller, etc.) and can be one processor or a plurality of processors that are operatively connected. The memory 1020 can include one or more non-transitory computer-readable storage media, such as RAM, ROM, EEPROM, EPROM, one or more memory devices, flash memory devices, etc., and combinations thereof.

The memory 1020 can store information that can be accessed by the one or more processors 1015. For instance, the memory 1020 (e.g., one or more non-transitory computer-readable storage mediums, memory devices) can include computer-readable instructions 1025 that can be executed by the one or more processors 1015. The instructions 1025 can be software written in any suitable programming language or can be implemented in hardware. Additionally, or alternatively, the instructions 1025 can be executed in logically and/or virtually separate threads on processor(s) 1015.

For example, the memory 1020 can store instructions 1025 that when executed by the one or more processors 1015 cause the one or more processors 1015 to perform operations such as any of the operations and functions of or for which the computing systems described herein are configured.

The memory 1020 can store data 1030 that can be obtained, received, accessed, written, manipulated, created, and/or stored. The data 1030 can include, for instance, map data, initial path data, trajectory data, sub-cost data, cost data, etc. as described herein. In some implementations, the computing device(s) 1010 can obtain from and/or store data in one or more memory device(s) that are remote from the computing system 1005 such as one or more memory devices of the computing system 1050.

The computing device(s) 1010 can also include a communication interface 1035 used to communicate with one or more other system(s) (e.g., computing system 1050). The communication interface 1035 can include any circuits, components, software, etc. for communicating via one or more networks (e.g., 1045). In some implementations, the communication interface 1035 can include for example, one or more of a communications controller, receiver, transceiver, transmitter, port, conductors, software and/or hardware for communicating data/information.

The computing system 1050 can include one or more computing devices 1055. The one or more computing devices 1055 can include one or more processors 1060 and a memory 1065. The one or more processors 1060 can be any suitable processing device (e.g., a processor core, a microprocessor, an ASIC, a FPGA, a controller, a microcontroller, etc.) and can be one processor or a plurality of processors that are operatively connected. The memory 1065 can include one or more non-transitory computer-readable storage media, such as RAM, ROM, EEPROM, EPROM, one or more memory devices, flash memory devices, etc., and combinations thereof.

The memory 1065 can store information that can be accessed by the one or more processors 1060. For instance, the memory 1065 (e.g., one or more non-transitory computer-readable storage mediums, memory devices) can store data 1075 that can be obtained, received, accessed, written, manipulated, created, and/or stored. The data 1075 can include, for instance, verification data, cost modification data, motion planning criteria, relational propositions, and/or other data or information described herein. In some implementations, the computing system 1050 can obtain data from one or more memory device(s) that are remote from the computing system 1050.

The memory 1065 can also store computer-readable instructions 1070 that can be executed by the one or more processors 1060. The instructions 1070 can be software written in any suitable programming language or can be implemented in hardware. Additionally, or alternatively, the instructions 1070 can be executed in logically and/or virtually separate threads on processor(s) 1060. For example, the memory 1065 can store instructions 1070 that when executed by the one or more processors 1060 cause the one or more processors 1060 to perform any of the operations and/or functions described herein, including, for example, any of the operations and functions of the devices described herein, and/or other operations and functions.

The computing device(s) 1055 can also include a communication interface 1080 used to communicate with one or more other system(s). The communication interface 1080 can include any circuits, components, software, etc. for communicating via one or more networks (e.g., 1045). In some implementations, the communication interface 1080 can include for example, one or more of a communications controller, receiver, transceiver, transmitter, port, conductors, software and/or hardware for communicating data/information.

The network(s) 1045 can be any type of network or combination of networks that allows for communication between devices. In some embodiments, the network(s) 1045 can include one or more of a local area network, wide area network, the Internet, secure network, cellular network, mesh network, peer-to-peer communication link and/or some combination thereof and can include any number of wired or wireless links. Communication over the network(s) 1045 can be accomplished, for instance, via a network interface using any type of protocol, protection scheme, encoding, format, packaging, etc.

FIG. 10 illustrates one example system 1000 that can be used to implement the present disclosure. Other computing systems can be used as well. Computing tasks discussed herein as being performed at an operations computing system can instead be performed remote from the operations computing system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system, the computing system comprising:
   one or more processors; and
   one or more tangible, non-transitory, computer readable media that collectively store instructions that when executed by the one or more processors cause the computing system to perform operations, the operations comprising:
      obtaining a plurality of sub-cost functions configured to evaluate a trajectory for controlling a motion of an autonomous vehicle, wherein each sub-cost function is configured to generate a respective sub-cost value indicative of the trajectory's impact on one or more motion planning criteria, wherein each sub-cost function is configured to generate the respective sub-cost value based, at least in part, on sensor data indicative of a surrounding environment of the autonomous vehicle, a period of time, and the trajectory;
      obtaining one or more relational propositions associated with the plurality of sub-cost functions, wherein each relational proposition is indicative of a desired relationship between at least two of the plurality of sub-cost functions;
      generating verification data indicative of whether the plurality of sub-cost functions achieve the one or more relational propositions based, at least in part, on the plurality of sub-cost functions and the one or more relational propositions; and
      providing for display, via one or more display devices, the verification data.

2. The computing system of claim 1, wherein one or more motion planning criteria comprise one or more safety criteria and one or more secondary criteria, wherein the one or more safety criteria are indicative of interference avoidance, road departure avoidance, or lane departure avoidance.

3. The computing system of claim 2, wherein the plurality of sub-cost functions comprise one or more safety sub-cost functions and one or more secondary sub-cost functions, wherein the one or more safety sub-cost functions are configured to generate one or more safety sub-cost values indicative of the trajectory's impact on at least one of the one or more safety criteria, and wherein the one or more secondary sub-cost functions are configured to generate one or more secondary sub-cost values indicative of the trajectory's impact on at least one of the one or more secondary criteria.

4. The computing system of claim 3, wherein at least one of the one or more relational propositions identifies a safety relationship between each of the one or more safety sub-cost functions and the one or more secondary sub-cost functions, wherein the safety relationship defines a requirement that each of the one or more safety sub-cost values generated by the one or more safety sub-cost functions outweigh any combination of the one or more secondary sub-cost values generated by the one or more secondary sub-cost functions.

5. The computing system of claim 1, wherein the operations further comprise: generating one or more cost modifications for the plurality of sub-cost functions based, at least in part, on the one or more relational propositions.

6. The computing system of claim 5, wherein the verification data indicates that the plurality of sub-cost functions do not achieve the one or more relational propositions, and wherein the operations further comprise:
   determining at least one deviating relational proposition, the at least one deviating relational proposition indicative of at least one of the one or more relational propositions that is not achieved by the plurality of sub-cost functions; and generating the one or more cost modifications for the plurality of sub-cost functions based, at least in part, on the at least one deviating relational proposition.

7. The computing system of claim 5, wherein the operations further comprise:

obtaining user input indicative of a costing change to at least one of the plurality of sub-cost functions or the one or more relational propositions; and generating the verification data based, at least in part, on the costing change.

8. The computing system of claim 7, wherein the costing change comprises an additional sub-cost function in addition to the plurality of sub-cost functions, and wherein the operations further comprise:

generating the one or more cost modifications for the plurality of sub-cost functions based, at least in part, on the additional sub-cost function.

9. The computing system of claim 7, wherein the costing change comprises an additional relational proposition in addition to the one or more relational propositions, and wherein the operations further comprise:

generating the one or more cost modifications for the plurality of sub-cost functions based, at least in part, on the additional relational proposition.

10. A computing system, the computing system comprising:

one or more processors; and one or more tangible, non-transitory, computer readable media that collectively store instructions that when executed by the one or more processors cause the computing system to perform operations, the operations comprising:

obtaining sensor data descriptive of an environment of an autonomous vehicle;

evaluating a plurality of sub-cost functions for a trajectory of the autonomous vehicle, wherein each sub-cost function is configured to generate a respective sub-cost value indicative of the trajectory's impact on one or more motion planning criteria, wherein each sub-cost function is configured to generate the respective sub-cost value based, at least in part, on the sensor data descriptive of the environment of the autonomous vehicle, a period of time, and the trajectory;

determining that the respective sub-cost values for the trajectory satisfy sub-cost criteria;

determining that one or more relational propositions associated with the plurality of sub-cost functions for the trajectory are achieved, wherein each relational proposition is indicative of a desired relationship between at least two of the plurality of sub-cost functions; and controlling the autonomous vehicle in accordance with the trajectory.

11. The computing system of claim 10, wherein one or more motion planning criteria comprise one or more safety criteria and one or more secondary criteria, wherein the one or more safety criteria are indicative of interference avoidance, road departure avoidance, or lane departure avoidance.

12. The computing system of claim 11, wherein the plurality of sub-cost functions comprise one or more safety sub-cost functions and one or more secondary sub-cost functions, wherein the one or more safety sub-cost functions are configured to generate one or more safety sub-cost values indicative of the trajectory's impact on at least one of the one or more safety criteria, and wherein the one or more secondary sub-cost functions are configured to generate one or more secondary sub-cost values indicative of the trajectory's impact on at least one of the one or more secondary criteria.

13. The computing system of claim 12, wherein at least one of the one or more relational propositions identifies a safety relationship between each of the one or more safety sub-cost functions and the one or more secondary sub-cost functions, wherein the safety relationship defines a requirement that each of the one or more safety sub-cost values generated by the one or more safety sub-cost functions outweigh any combination of the one or more secondary sub-cost values generated by the one or more secondary sub-cost functions.

* * * * *

UNITED STATES PATENT AND TRADEMARK OFFICE
CERTIFICATE OF CORRECTION

| | |
|---|---|
| PATENT NO. | : 11,827,240 B2 |
| APPLICATION NO. | : 17/130124 |
| DATED | : November 28, 2023 |
| INVENTOR(S) | : Subramanian et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 347 days.

Signed and Sealed this
First Day of July, 2025

Coke Morgan Stewart
*Acting Director of the United States Patent and Trademark Office*